United States Patent
Al Belooshi

(10) Patent No.: US 11,436,341 B2
(45) Date of Patent: Sep. 6, 2022

(54) SYSTEM AND METHOD FOR CRYPTOGRAPHIC KEYS SECURITY IN THE CLOUD

(71) Applicant: Bushra Abbas Mohammed Al Belooshi, Sharjah (AE)

(72) Inventor: Bushra Abbas Mohammed Al Belooshi, Sharjah (AE)

( * ) Notice: Subject to any disclaimer, the term of this patent is extended or adjusted under 35 U.S.C. 154(b) by 0 days.

(21) Appl. No.: 16/637,198

(22) PCT Filed: Apr. 10, 2019

(86) PCT No.: PCT/IB2019/052948
§ 371 (c)(1),
(2) Date: Feb. 6, 2020

(87) PCT Pub. No.: WO2019/198003
PCT Pub. Date: Oct. 17, 2019

(65) Prior Publication Data
US 2020/0250318 A1 Aug. 6, 2020

Related U.S. Application Data

(60) Provisional application No. 62/655,363, filed on Apr. 10, 2018.

(51) Int. Cl.
*G06F 21/60* (2013.01)
*G06F 12/14* (2006.01)
(Continued)

(52) U.S. Cl.
CPC ........ *G06F 21/602* (2013.01); *G06F 12/1408* (2013.01); *G06F 21/62* (2013.01);
(Continued)

(58) Field of Classification Search
CPC ........ G06F 21/602; G06F 21/62; G06F 21/71; G06F 12/1408; H04L 9/0631; H04L 9/0637; H04L 9/0662; H04L 9/0897
See application file for complete search history.

(56) References Cited

U.S. PATENT DOCUMENTS 7,054,443 B1 * 5/2006 Jakubowski ..... G11B 20/00086
380/201
8,719,590 B1 * 5/2014 Faibish ............... H04L 63/0428
713/190
(Continued)

FOREIGN PATENT DOCUMENTS

WO 0225410 A2 3/2002

OTHER PUBLICATIONS

S. Sanjeev, J. Lodhia, R. Srinivasan and P. Dasgupta, "Protecting Cryptographic Keys on Client Platforms Using Virtualization and Raw Disk Image Access," 2011 IEEE Third International Conference on Privacy, Security, Risk and Trust and 2011 IEEE Third International Conference on Social Computing, 2011, pp. 1026-10.*

(Continued)

*Primary Examiner* — Matthew T Henning
(74) *Attorney, Agent, or Firm* — Hayes Soloway P.C.

(57) ABSTRACT

An improved method or security solution for securing cryptographic keys in a virtual machine RAM. A security solution is proposed to hide cryptographic keys in the cloud, without the necessity of any architectural modifications. The present solution requires the availability of a Trusted Platform Module (TPM) capable of creating and holding a protected public/private key pair. It lends itself to security-as-a-service scenarios where third parties perform encryption or decryption on behalf of data owners. This allows the present solution to be easily integrated and coupled with other existing cloud architectures. A decrypt-scatter or gather-decrypt solution which allows users to carry out (Continued)

| 0  | 4  | 8  | 12 | 16 |
|----|----|----|----|----|
| 2b | 28 | ab | 09 | 8b |
| 1  | 5  | 9  | 13 | 17 |
| 7e | ae | f7 | cf | 84 |
| 2  | 6  | 10 | 14 | 18 |
| 15 | d2 | 15 | 4f | eb |
| 3  | 7  | 11 | 15 | 19 |
| 16 | a6 | 88 | 3c | 01 | encryption or decryption while protecting keys from unauthorized peeks by the cloud administrators is proposed.

18 Claims, 10 Drawing Sheets

(51) Int. Cl.
    *G06F 21/62*     (2013.01)
    *G06F 21/71*     (2013.01)
    *H04L 9/06*     (2006.01)
    *H04L 9/08*     (2006.01)

(52) U.S. Cl.
    CPC ............ *G06F 21/71* (2013.01); *H04L 9/0631* (2013.01); *H04L 9/0637* (2013.01); *H04L 9/0662* (2013.01); *H04L 9/0897* (2013.01)

(56) References Cited

U.S. PATENT DOCUMENTS

| | | | |
|---|---|---|---|
| 9,614,669 B1* | 4/2017 | Cox, Jr. | ............ H04L 63/0435 |
| 2006/0002549 A1 | 1/2006 | Avasarala et al. | |
| 2008/0056490 A1* | 3/2008 | Akishita | ............... H04L 9/0631 |
| | | | 380/44 |
| 2008/0285747 A1 | 11/2008 | Kim et al. | |
| 2012/0275600 A1 | 11/2012 | Arnold et al. | |
| 2013/0145177 A1 | 6/2013 | Cordella et al. | |
| 2016/0306750 A1 | 10/2016 | Tucker et al. | |

OTHER PUBLICATIONS

F. Mohamed, B. AlBelooshi, K. Salah, C. Y. Yeun and E. Damiani, "A Scattering Technique for Protecting Cryptographic Keys in the Cloud," 2017 IEEE 2nd International Workshops on Foundations and Applications of Self* Systems (FAS*W), Oct. 12, 2017, pp. 301-306.*

B. AlBelooshi, K. Salah, T. Martin and E. Damiani, "Securing Cryptographic Keys in the IaaS Cloud Model," 2015 IEEE/ACM 8th International Conference on Utility and Cloud Computing (UCC), 2015, pp. 397-401.*

* cited by examiner

SYSTEM AND METHOD FOR CRYPTOGRAPHIC KEYS SECURITY IN THE CLOUD

CROSS-REFERENCE TO RELATED APPLICATIONS AND PRIORITY

This patent application claims priority from PCT Patent Application No. PCT/IB2019/052948 filed Apr. 10, 2019, which claims priority from U.S. Provisional Patent Application No. 62/655,363 filed Apr. 10, 2018. Each of these patent applications are herein incorporated by reference in its/their entirety.

FIELD OF THE INVENTION

The present invention relates to the field of encryption or decryption of digital data and more particularly, to an improved method of encrypting and/or decrypting digital data using a scattered key without being fully assembled in a personal computer (PC) or a virtual machine (VM) memory.

BACKGROUND OF THE INVENTION

Cloud Computing is currently one of the most popular and emerging trends in the field of Information Technology. It supplies Information and communication technology (ICT) infrastructure including servers, storage and networking on—demand in a pay-as-you-go fashion that attracts many customers for its deployment. Cloud providers lease their clients' virtual machines (VMs) that are controlled by cloud administrators who can run, stop, restore and migrate the VMs. A typical threat to the cloud VMs is unauthorized access of untrustworthy administrators to cloud users' sensitive information residing within a virtual machine memory. Moreover, attackers gaining access to a management VM or any co-located VMs can easily steal sensitive information from the VM memory.

Under European and US data protection laws, organizations are fully responsible for sensitive information, such as the personal data of their customers and employees. They must guarantee data security even when a third-party, such as a cloud provider processes the data on their behalf. For this reason, data security issues have become an important consideration in any cloud provisioning arrangement. Data owners increasingly require that outsourcing contracts specify all details of the cloud providers' internal security procedures, including cloud-based cryptographic services. However, many cloud users still have trouble understanding cloud-based cryptography—and therefore are not prepared to trust cloud-based cryptographic services. Standardization bodies and security agencies worldwide are fully aware of this situation and accordingly, the US Standard Institute, NIST released a study discussing open issues and challenges in the management of cryptographic keys over the cloud.

In principle, one might even wonder about the need for cloud-based cryptography at all. Data owners wishing to use the public cloud for their applications could handle data protection by performing encryption and decryption on their own (or on a trusted third party's) premises. Historically, encrypted data was stored on servers which resided on premises over which the data owner had direct, physical control and hence, using the public cloud as a mere virtualization of such servers may look like an attractive option. In this scenario, data owners would simply have to select one or more untrusted cloud providers and encrypt their data before sending it to the cloud for storage or processing. Most of the traditional current services require data processing in addition to storage. A single untrusted cloud provider who is not allowed to decrypt customer data will be unable to deliver most commercial processing services.

Utilizing multiple cloud providers for different stages of encryption or decryption can be seen as a viable alternative. Much research has been done on scenarios where multiple untrusted cloud providers together with combinations of Fully Homomorphic Encryption (FHE), secret sharing and other Secure Multi-Party Computation (SMC) techniques are used to process encrypted data without decryption. However, the sheer complexity of these solutions in terms of multi-party cloud service contracts and Service-Level-Agreements (SLAs) along with the generated performance overhead has until now hindered their practical deployment. Hence, concerned data owners who want to keep their data encrypted most of the time (unless plaintext is required to perform a computation) are required to partner with a cryptographic service provider which can manage encryption and decryption of data as a service on the cloud or on its own premises. While this solution is contractually simpler, it requires data owners to trust the partner's internal operation and, above all, to understand and approve its precautions against threats to the cryptographic keys.

When a data owner outsources decryption, the data and the decryption key associated with it also needs to be released. When decryption is performed, the key needs to be loaded into the decryption services' memory. If the service has been compromised at this stage, the whole system's security will break down. Unfortunately, there is no scarcity of known attacks to physical or virtualized RAM, and the issue of securing cryptographic keys is still considered an unsolved problem. The idea of extracting cryptographic keys from memory was put forward as early as 1998. The first successful attack on physical RAM was accomplished in 2005 by compromising the Direct Memory Access (DMA) chip set. The most well-known attack on the physical RAM is the cold boot attack. In the cloud, however, providers enjoy full access to physical and virtual memory, and do not need any special technique to read their customers' RAM. According to Cloud Security Alliance (CSA), the malicious insider threat is identified as the third top threat to cloud computing security.

Several practical attacks and vulnerabilities have been identified that may compromise the VM memory in the cloud. For example vulnerability CVE-2015-3340, in Xen 4.2.x through 4.5.x, consisted of a failure to initialize certain fields, which allows certain remote service domains to obtain sensitive information from the memory. A cross side channel attack was described that allows the retrieval of the private key from a co-located tenant's virtual machine. Other vulnerabilities allow rogue co-tenants, the virtual machines located within the same physical server of the victim machine, to get access to the cloud management domain (which is the management VM controlling all of the other VMs) and therefore access other tenants' VM data and RAM. Examples of real cloud attacks carried from the cloud provider end (including cloud provider employees or insider attacks) include Dropbox, Amazon EC2 and S3 attacks. Insider attacks have also been reported; for instance, Google fired two of its employees for breaching user privacy. Reports on attacks and vulnerabilities in the cloud raise a real need for securing cryptography keys when data is transferred and processed in a third party environment.

Security is one of the main barriers preventing many organizations from deploying cloud computing services.

While it is comparatively easy to secure networks and disks in the cloud by adapting existing security techniques such as full disk encryption, VPN, SSL and TLS, it is more difficult to secure a VM RAM. Disk encryption can protect the cloud storage from malicious attackers; however, processing such data will require decrypting it before performing any computational process. During the encryption and decryption process of data, the cryptographic key will be loaded in the VM RAM. This allows attackers gaining access to the VM RAM to extract the keys and decrypt all the sensitive information from the VM encrypted disks.

Although the cold boot attack on physical machine memory is effective, it is difficult to implement as the attacker needs physical access to the victim machine's memory. With virtualization, VM memory can be obtained with a single command from the management VM. This raises new security issues and challenges. Even if the administrators of the management VM are not malicious, external attackers or malicious co-tenants who gain access to the management VM or to the client VM itself, can easily extract the cryptographic keys from the VM RAM. This will consequently allow them to extract all the secret and sensitive information from the encrypted disk.

Accordingly, there exists a need to provide a method for securing cryptographic keys in a virtual machine RAM from malicious internal and external attackers.

SUMMARY OF THE INVENTION

Therefore it is an object of the present invention to provide a method or security solution for securing cryptographic keys in a virtual machine RAM.

The present invention involves a method of securing a key in a computing environment using decrypt-scatter and gather-decrypt techniques, the key comprising a plurality of key chunks, the method comprising the steps of generating a plurality of scattered memory addresses, storing the plurality of key chunks in the plurality of generated scattered memory addresses, such that each scattered memory address stores a single key chunk among the plurality of key chunks; and generating a plurality of temporary memory addresses, wherein each temporary memory address stores a temporary value used for calculating a round key, wherein the plurality of key chunks are scattered column-wise within the plurality of scattered memory addresses.

In another embodiment of the present invention, the plurality of temporary memory addresses each storing a temporary value are located at an end of the plurality of scattered memory addresses.

In another embodiment of the present invention, the plurality of temporary memory addresses each storing a temporary value are located at a beginning of the plurality of scattered memory addresses.

In another embodiment of the present invention, the round key is calculated only when required, to avoid storing of the round key or an AES key schedule within any memory location.

In another embodiment of the present invention, the plurality of key chunks are stored in the form of bytes.

In another embodiment of the present invention, the plurality of scattered memory addresses are randomly generated memory address locations.

In another embodiment of the present invention, the plurality of scattered memory addresses are randomly generated using a Pseudo Random Number Generator (PRNG).

In another embodiment of the present invention, the method further comprises implementing an Advanced Encryption Standard (AES) encryption algorithm on the plurality of key chunks.

In another embodiment of the present invention, the calculated round key is XORed with an array of plain text chunks on which the Advanced Encryption Standard (AES) algorithm is implemented.

As another aspect of the present invention is disclosed a method of securing a key in a computing environment using decrypt-scatter and gather-decrypt techniques, the key comprising a plurality of key chunks, the method comprising the steps of generating a plurality of scattered memory addresses, storing the plurality of key chunks in the plurality of generated scattered memory addresses, such that each scattered memory address stores a single key chunk among the plurality of key chunks; and generating a plurality of temporary memory addresses, wherein each temporary memory address stores a temporary value used for calculating a round key, wherein the plurality of key chunks are scattered row-wise within the plurality of scattered memory addresses.

In another embodiment of the present invention, the plurality of temporary memory addresses each storing a temporary value are located at an end of the plurality of scattered memory addresses.

In another embodiment of the present invention, the plurality of temporary memory addresses each storing a temporary value are located at a beginning of the plurality of scattered memory addresses.

In another embodiment of the present invention, the round key is calculated only when required, to avoid storing of the round key or an AES key schedule within any memory location.

In another embodiment of the present invention, the plurality of key chunks are stored in the form of bytes.

In another embodiment of the present invention, the plurality of scattered memory addresses are randomly generated memory address locations.

In another embodiment of the present invention, the plurality of scattered memory addresses are randomly generated using a Pseudo Random Number Generator (PRNG).

In another embodiment of the present invention, the method further comprises implementing an Advanced Encryption Standard (AES) encryption algorithm on the plurality of key chunks.

In another embodiment of the present invention, the calculated round key is XORed with an array of plain text chunks on which the Advanced Encryption Standard (AES) algorithm is implemented.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which—

DETAILED DESCRIPTION OF THE INVENTION

Figure 1:
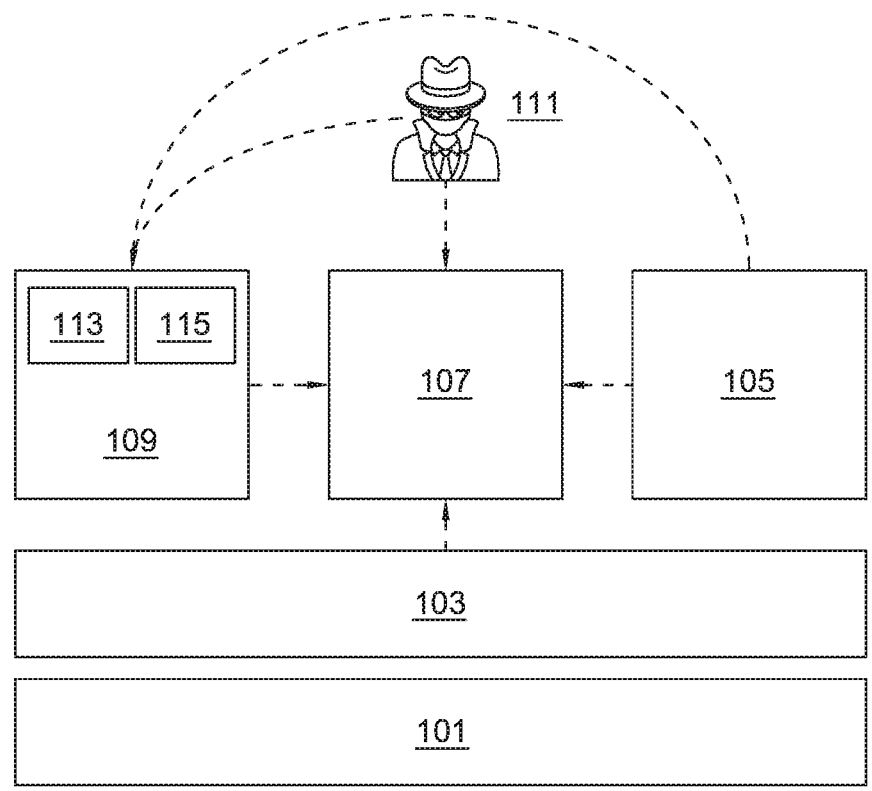
FIG. 1 denotes main components of a standard cloud environment

The aspects of the method for securing cryptographic keys in a virtual machine RAM according to the present invention will be described in conjunction with FIGS. 1-10. In the Detailed Description, reference is made to the accompanying figures, which form a part hereof, and in which is shown by way of illustration specific embodiments in which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

The present invention deals with development of a security solution to hide cryptographic keys in the cloud, without the necessity of any architectural modifications. The present solution only requires the availability of a Trusted Platform Module (TPM) capable of creating and holding a protected public/private key pair. It lends itself to security-as-a-service scenarios where third parties perform encryption or decryption on behalf of data owners. This allows the present solution to be easily integrated and coupled with other existing cloud architectures. The solution in accordance with the present invention focuses on the threat of users' cryptographic keys being stolen from the RAM of the VM they provision and analyzes experimentally the data remanence problem in the cloud, proving that Advanced Encryption Standard (AES) keys can be easily extracted from VM RAM.

Virtualization is defined as the act of using software to create a virtual (versus physical) version of a computer system, often called a virtual machine (VM). Host hardware is emulated using specialized software called the hypervisor, which allows multiple VMs to run independently with different guest operating systems. There are two main types of virtualization. In Type I hypervisor-based virtualization, the hypervisor runs directly above the physical hardware (bare metal hypervisor) and intercepts all the communications between the hardware and the VMs. Examples of this approach are Xen, VMWare ESX and Microsoft Hyper-V. In Type II hypervisor-based virtualization, the hypervisor runs on top of the operating system of a physical host. In this type of virtualization, the hypervisor does not have a direct access to hardware; rather, access is only provided via the host operating system. Examples of this type of virtualization are VMWare Player, VMWare Workstation and Microsoft Virtual Server.

The proposed solution aims at securing cryptographic keys in the cloud. The solution carries out encryption or decryption while protecting the cryptographic keys from unauthorized access to the virtual machine (VM) random access memory (RAM), where the keys get stored. A decrypt-scatter or gather-decrypt solution which allows users to carry out encryption or decryption while protecting keys from unauthorized peeks by the cloud administrators is proposed. The present solution does not require modifications to the current cloud architectures, and is designed to be highly portable to existing cloud computation platforms.

The architecture, in accordance with the present invention, is focused on Infrastructure-as-a-Service (IaaS) model and specifically on Xen hypervisor (a hypervisor using a microkernel design, providing services that allow multiple computer operating systems to execute on the same computer hardware concurrently. It was developed by the University of Cambridge and is currently being developed by the Linux Foundation with support from Intel). Accordingly, in the present invention, terminology reminiscent of Xen is being used. The present invention my work on Platform-as-a-Service (PaaS) model and Software-as-a-Service (SaaS) model as well.

Privileged VM in Xen responsible for managing other VMs is known as Dom0 while unprivileged VMs are defined as DomU. In Xen, most of the management tasks are carried out by management administrators running on Dom0 using management or introspection tools. Accordingly, in the present invention, terms Dom0 and DomU are used to denote the cloud administration VM and user VMs, respectively. As denoted in FIG. 1, main components of the standard cloud environment are demonstrated, wherein various attacker channels are depicted using numerals 1 to 6. Hardware components are depicted as 101. Channel 1 is from the hypervisor 103 as it has full capabilities to manage and control the VM 107 and its resources such as memory resources, channel 2 is from other malicious tenant VMs 105, considering that no proper isolation between the VMs is available. Channel 3 is formed since the virtual machine in the cloud is connected to the network that may allow external attackers 111 to gain access to it. Since management Dom0 109 facilitates start, stop and migration of victim VMs, channel 4 has access to the VM RAM 107 specifically. Management VM 109 further comprises a VM interface 113 and management tools 115. Channels 5 and 6 are formed since malicious virtual machine users 105 and remote attackers 111 gain access to the management VM 109 which in turn allow them to access other VMs 107.

In accordance with the present invention, prominent adversaries who could attempt to extract cryptographic keys from a VM RAM include malicious administrators, malicious co-tenant VMs compromising the victim VM, malicious co-tenant VMs compromising the management domain, external attackers compromising the victim VM and external attackers compromising the management domain. Three main sources for cryptographic key leakage from a VM RAM are multi-tenancy, memory over commitment techniques, and preconfigured templates. Multi-tenancy allows multiple users from different organizations to share resources on the same physical machines. This raises the possibility that some resources might leak from one user to another. The issue will become more serious in public cloud as the resources are shared with unknown users.

One of the main features in the cloud is resource sharing, which includes memory sharing between different VMs. The hypervisor has the responsibility of managing the memory allocation in VMs. A portion of the memory will be used by the hypervisor and the rest will be available for the VMs. The advantage of sharing physical host memory in the cloud is that VMs can be allocated more memory than what is physically available in the host. This situation is known as memory over commitment. Memory over commitment techniques raise concerns about how memory pages are re-allocated from one VM to another. Moreover, it is not guaranteed that those pages will be cleared before they are assigned to other VMs. Memory swap files are also another source that might hold data remnant from other users.

A template is a perfect, model copy of a virtual machine from which an administrator can clone, convert or deploy more virtual machines. Therefore, templates include the necessary configurations and applications needed to create new instances. Templates are of common use in public clouds; for instance, in Amazon's cloud platform they are known as Amazon Machine Images (AMIs). The pedigree of AMIs varies based on publisher, from AWS customers who self-publish, to AWS technology partners to publish in a more curated catalog called AWS Marketplace, to AMIs published by Amazon itself. When those templates are published and made publicly available for other cloud users to use, if the recommended security best practices for AMI creation are not followed then sensitive information belonging to template creators could potentially be leaked.

Figure 2:
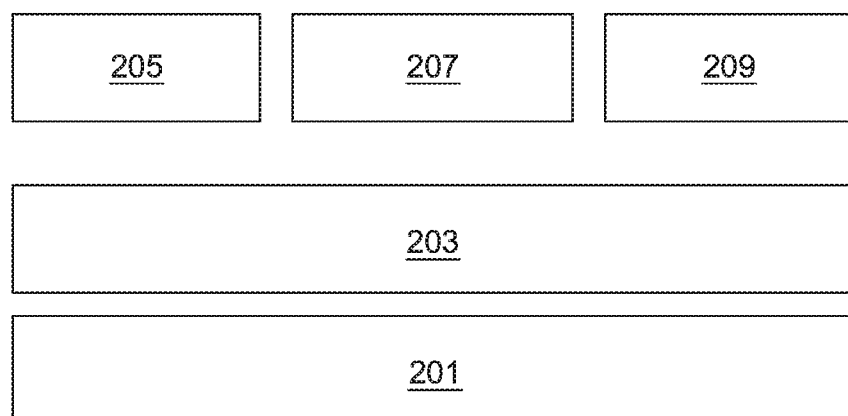
FIG. 2 depicts a structural arrangement of a hypervisor and management virtual machines (VMs), in accordance with the present invention

Xen is a thin layer hypervisor that aggregates most of the administration control tasks to the upper level management VM named Dom0. Other VMs in Xen are called DomUx, where x=1, 2, . . . for each of the VMs as shown in FIG. 2. Dom0 administrators in Xen are responsible for building, stopping, suspension and introspection of a DomU. Moreover, Dom0 administrators have introspection tools which allow them to monitor malicious behavior that may take place or originate from a DomU. Hardware components are depicted as 201. Considering memory virtualization in Xen, the Xen hypervisor 203 partitions physical memory into nodes, and then allocates them to VMs trying to ensure memory locality, which means that VMs running on the same physical CPU are allocated pages from the nodes local to that particular CPU. Xen explicitly scrubs the memory once a VM is destroyed. However, the memory over commitment technique implemented in Xen is ballooning and has previously been recommended that this feature be turned off on Xen-based public clouds in order to prevent data leakage between the VMs.

There is a special VM (Management VM) 205 that sits on top of the hypervisor, is created at boot time and is responsible for managing the guest VMs running on the same physical host. The management VM 205, also known as Dom0 in Xen, maps the guest VM (DomU) memory page table in order to perform a number of tasks. Guest VMs are depicted as 207 and 209 in FIG. 2. For example, Dom0 administrators are responsible for complex operations to start, suspend, resume and migrate running VMs from one physical host to another. Dom0 205 has access to read the guest memory page tables during the suspension and migration processes in order to save the state of the VM. It will save the page tables in a file that will be used when resuming the VM or when migration is completed. Dom0 205 also runs management applications that can inspect the running VMs and check that no malicious software is installed or attacks are being launched from the guest VM (207 or 209). Dom0 205 also manages the memory resources provided to the guest VMs (207 or 209) and controls their access to the physical disks and network drivers. In a way, the management VM has considerable access to a guest VM memory and may issue legitimate hypercalls to read memory contents of other domains. Even if the disks and network packets are encrypted, the management VM may obtain sensitive data from the guest VM memory, such as the cryptographic keys. From the client's point of view, those administrators cannot be trusted not to peek into their data stored in a DomU's RAM or a client's VM RAM. Therefore, storing cryptographic keys in an easy-to-find location within the user VM RAM while encryption or decryption operations are performed poses a very serious vulnerability.

In another embodiment of the present invention, three experiments were conducted with regard to the VM RAM. The objective of the first experiment was to extract any useful information from the memory dump, whereas, in the second experiment the focus was on extracting cryptographic keys. In the third experiment, different scenarios were implemented to pollute the memory of a cotenant machine and to check whether Xen Server RAM scrubbing technique (data scrubbing or data cleansing, is an error correction technique in which a background process periodically inspects the contents of memory and fixes any errors or inconsistencies by replacing them with a functional copy of the data) works as expected.

Considering the first experiment in accordance with the present invention, the access capabilities that cloud Dom0 administrators may have over the VM RAM were focused on. The objective of this experiment was to analyze data that can be captured from the VM RAM and might be used illegally by a rogue administrator or an external attacker. In order to execute this experiment, a Debian VM was created on the Xen 4.4 project following which the Xen specific command was executed on Dom0 to dump the RAM of a specific VM:

$ xl dump-core domain-id [filename]

The result obtained from this experiment was that the DomU RAM dump file which was saved in a specific folder in the server host, namely/var/lib/xen. Further, that dump was analyzed in another investigation machine where HxD tool was installed to display hexadecimal contents. Unlike a real attack scenario, the host IP, VM IP, VM MAC address and the VM root password were known. Accordingly, the VM root password and the VM MAC address were extracted from the client VM. Moreover, the IP address of the VM itself and the host IP address were also extracted from the dump. Xen has been widely deployed by many cloud providers. Therefore, if implemented without further customizations then useful information can be captured by a malicious user accessing the VM. Hence, confidential data such as root passwords should be cleared from the VM RAM, through encryption or wiping out directly after its use.

The objective of the second experiment in accordance with the present invention, is to capture cryptographic keys from the VM RAM. Extracting the RAM dump of a specific VM is an easy task that can be executed with a single command. The experiment was initiated by creating a Debain VM on Xen4.4 project subsequent to which AES encryption on that VM was run. After this, the RAM dump was extracted from Dom0 using the previously mentioned command. The dump file captured in this experiment was analysed using the AESKeyFinder tool that checks for the key schedule of AES. The tool was able to capture the key in a few seconds. This experiment resulted in finding the AES key in a dump that was captured while AES was running, and proves that a simple attack can easily capture the AES key.

The objective of the third experiment in accordance with the present invention, is to test whether VM RAM is accessible by other co-located tenants within the same physical host. It is also tested whether RAM scrubbing functionality and its implementation in Xen will prevent such access. Three different scenarios were conducted in this experiment. First, a new virtual machine VM1 is created on Xen Server 6.2. Secondly, two VMs (VM1 and VM2) with equal sizes, each equal to the total remaining memory size of the host server are created. Thirdly, two VMs (VM1 and VM2) that are allocated the same amount of RAM are created. The above experiment with different scenarios indicated that the memory scrubbing technique implemented in XenServer will likely prevent data leakage from the VM RAM after VM termination. However, in some other virtualization environments where scrubbing is not available, leakage from VM RAM could still happen. VM RAM is a critical place where a great deal of sensitive data resides. A powerful security mechanism should be implemented to prevent data leakage from VM RAM. Cryptographic keys are among the most valuable data which could be captured, leading to the exposure of sensitive data.

Another experiment was conducted in accordance with the present invention to focus on data remanence in the hard disk storage. The objective of the experiment is to test if the VM data remains in the physical host storage after VM termination. The media storage in the cloud should be sanitized of any data before being reused by other VMs and best practices suggest that data in the cloud should be sanitized once the VM is destroyed. The experiment started by attaching an additional external USB storage to the physical host. An Ubuntu virtual machine (VM1) is then created occupying almost all the disk space on the USB. The hard disk experiment shows that the data remains in the cloud hard disk even after deleting the VM. While it is not possible to get the hard disk data from the newly created VM, it is possible to analyze it from the hard disk itself using an HxD hexadecimal tool. It is important to have a clear transparent service level agreement (SLA) with the content security policy (CSP) which will guarantee the data storage deletion after VM termination. Also, it is host performance overhead to clear VM storage after termination.

In accordance with an embodiment of the present invention, a technique or solution for securing cryptographic keys in untrusted cloud environments is disclosed. The solution is based on a powerful technique called variable scattering. Encryption keys are scattered dynamically to random memory address locations. An encryption/decryption agent runs a custom implementation of the AES encryption algorithm on the scattered key which is never gathered as a whole (never fully assembled), preventing the cloud administrator to peek at the key. On-the-fly round key generation is used, which means the agent, at any point of time, will hold only a minimum portion of the round key needed to decrypt the data, which is one byte.

Figure 3:
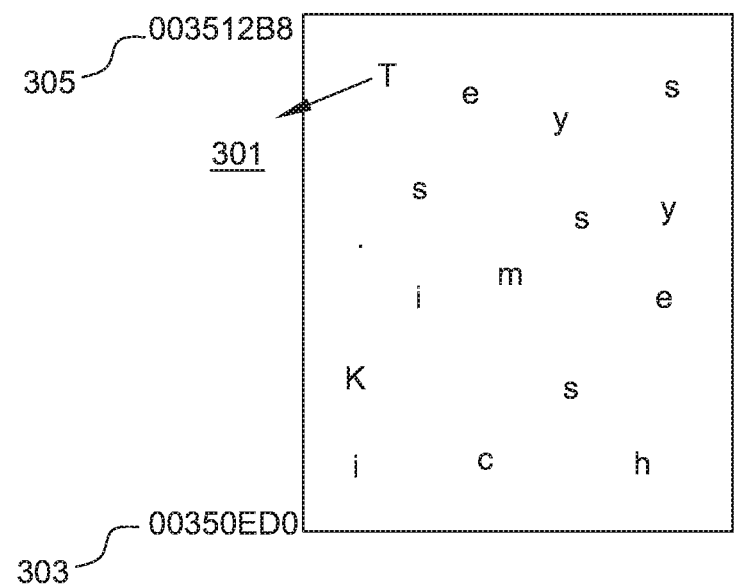
FIG. 3 depicts the decrypt-scatter or gather-decrypt technique in accordance with the present invention

The decrypt-scatter or gather-decrypt technique in the present invention starts with allocating a fixed buffer size (1024 Bytes) in a random memory location as shown in FIG. 3. Subsequent to this, different random address locations are generated using a Pseudo Random Number Generator (PRNG) technique with a specific random seed value. These addresses (303 and 305) are then used to distribute the round keys. When decrypting the data, the same seed value is used to re-generate the same random addresses and retrieve the key values. At any point in time only one byte of the round key is reconstructed. The AES-CBC encryption algorithm is modified to integrate gather-decrypt phase when using the scattered round keys. 301 denotes various scattered key bytes within an allocated block of 1 kB.

This scattering scheme is coupled with secure uploading of the data owner's key on the encryption/decryption service virtual machine. When uploaded, the data owner's key is encrypted with a public key, whose private counterpart is stored in a tamper-resistant vTPM that virtualizes a physical TPM on the cloud. This way the data owner's key never gets exposed clearly on the cloud provider's premises. The Xen open-source Type-I hypervisor deployed by public cloud providers such as Amazon EC2 was used in the target configuration. Further, this scattering solution can be integrated to any hypervisor design and runs a custom implementation of AES-CBC algorithm, as today's disk encryption solutions are based on symmetric key encryption and AES is a well-known secure symmetric algorithm. A 128-bit key is implemented, however other key sizes (e.g. 256-bit key) can also be used.

Figure 4:
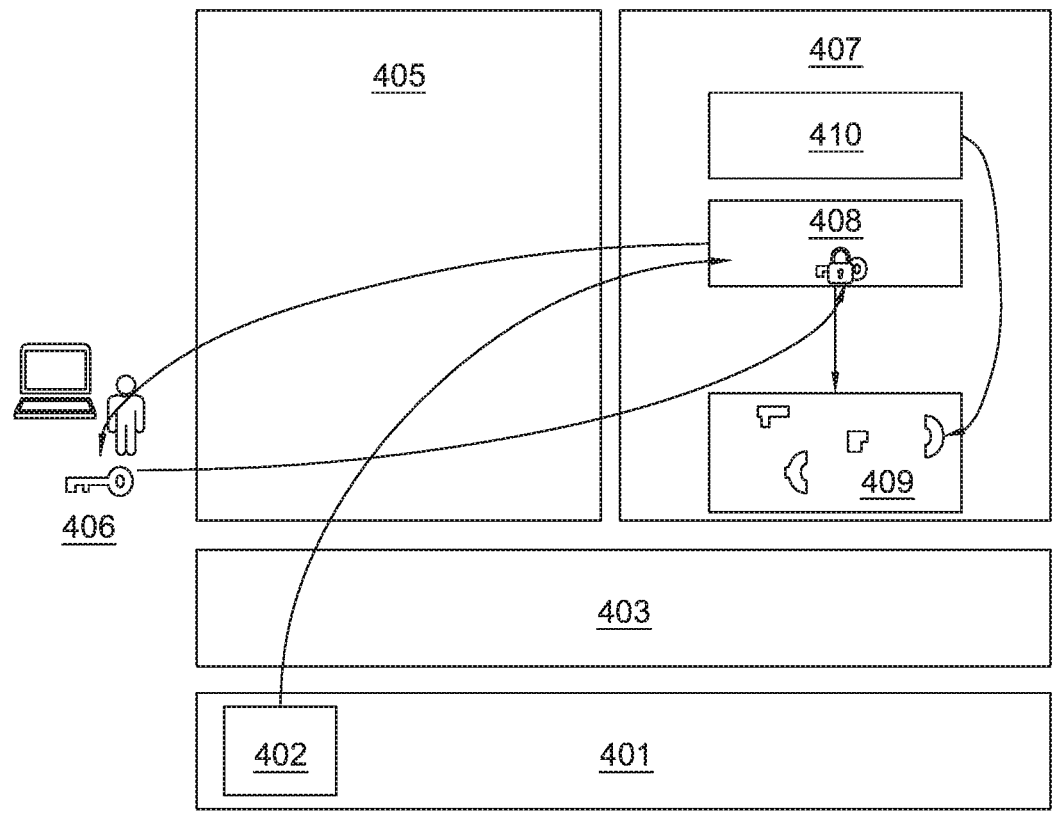
FIG. 4 illustrates the proposed architecture in accordance with the present invention FIGS. 5 (a) and 5 (b) show processes of instance creation, key scattering and key gathering/decryption, in accordance with the present invention FIGS. 6 (a) and 6 (b) depict replacing key scheduling process and the AddRoundKey function with decrypt-scatter and gather-decrypt techniques in accordance with the present invention

The proposed architecture in accordance with the present invention is flexible, scalable and can run on most current virtualization stacks without modifications. Moreover, it does not require any additional services or servers. The scattering agent, the customers' applications and the encrypted data are all stored at the cloud provider site benefiting from the scalability, usability and other cloud advantages. The overall architecture of the solution in accordance with the present invention is shown in FIG. 4. Each user application will have a single master key (MK) 406 stored on the data owner's premises and never exposed to the cloud provider. Each application will have a set of data objects (either files or disks) that are encrypted with specific unique data keys (DKt). Those data keys will be encrypted with the user master key (MK) 406 to keep them secure while they are stored in the cloud provider premises. Therefore, each cloud application will use a single master key 406 that is used to encrypt the other data objects specific keys. The master keys are stored at the data owner's premises. As shown in Step 1 of FIG. 4, when such keys are uploaded to the untrusted cloud provider environment 407, the encryption agent will first request vTPM RSA public key (PKvTPM). This is transferred securely to the data owner to encrypt his master key 406 (Step 2). After that, the encrypted master key 406 is transferred to the encryption agent in the cloud (Step 3). The decrypt-scatter function 408 in the scattering agent will then decrypt one byte of the master key 406 and scatter it in the target VM's RAM 409 (Step 4). Decryption key bytes are gathered on-the-fly while the decryption process takes place, using the gather-decrypt function 410 as shown in Step 5. 405 depicts the management VM, 403 depicts the hypervisor and 401 depicts the hardware components.

This cryptographic service may be placed within the same VM as the cloud-based application requesting encryption/decryption or on a separate VM, in the same or in different cloud providers' environments. Our TCB (trusted computing base/the totality of protection mechanisms —hardware, firmware and software—that provide a secure computing environment) includes only the hardware, hypervisor and the vTPM (virtual trusted platform module) components. All other components in the architecture may be considered as untrusted. The solution in accordance with the present invention is deployed according to three different scenarios based on a security agent's location. The agent can be embedded within the customer's application itself (application specific deployment). Alternatively, the agent can be located on an intermediary server positioned between the customer's application and the cloud data storage (intermediary-based deployment). The last approach is to deploy the agent on the existing TTP (representations of the behavior or modus operandi of cyber adversaries), where the third party will never access or get to know the keys (TTP-based deployment).

Considering the application specific deployment model, the scattering service is an integral part of the users' application. Whenever the application is being accessed and the user is authenticated, the security agent will start. The master key is imported and scattered securely within the application server. Once the application is suspended or terminated, the key will consequently be removed from the server. In the intermediary-based deployment model, the scattering agent is introduced on a different server within the same CSP (cloud service provider) cloud where the application server and storage are placed. The scattering agent will act as an intermediary between the customer's application and the encrypted storage. The agent will receive the requests for reading and writing to the encrypted storage. The server, where the scattering agent is hosted, represents a single separate VM within the same cloud environment.

Considering the trusted third party-based deployment, a third party is introduced to manage and provide the encryption/decryption services for the customer's data. From the customer's point of view, however, those trusted providers may also have curious employees who can access their data. To prevent this, the scattering technique is deployed on a third party's premises. The security agent runs in a separate VM where the key will be scattered and the data is decrypted. Similar to previous approaches, the key is transmitted securely to the cloud provider using SSL communication and by encrypting the key with the vTPM RSA public key.

Figure 5A:
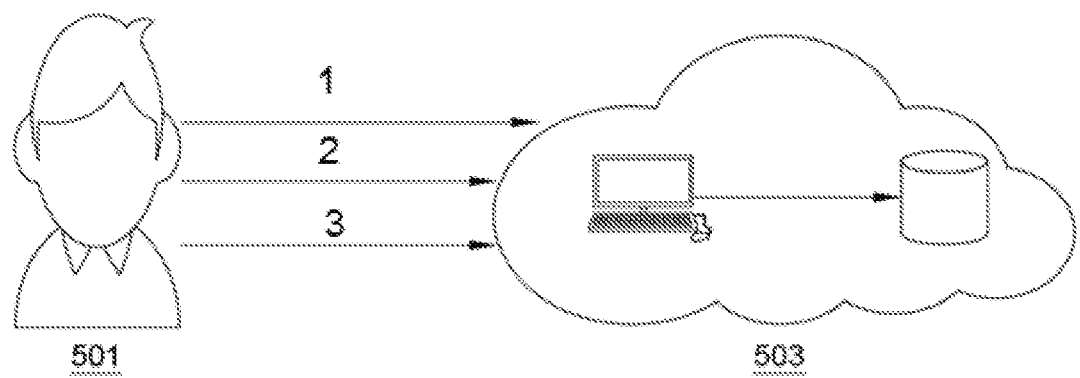
Figure 5B:
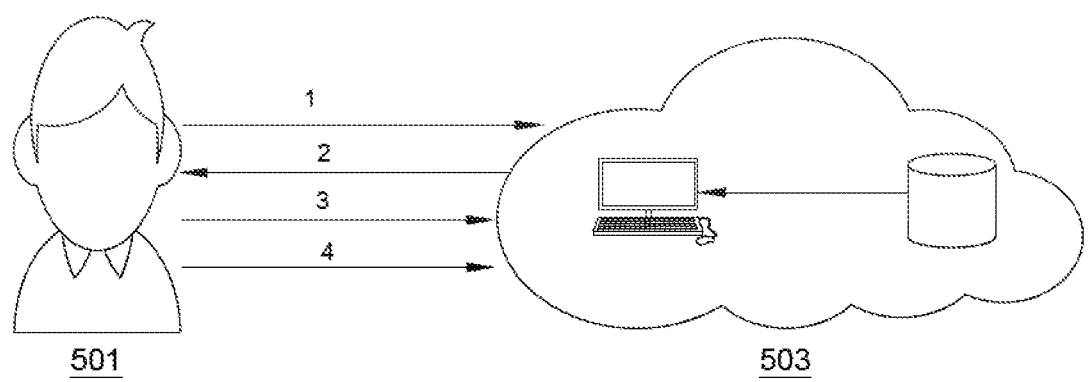

In another embodiment of the present invention, is a process of creating a new VM in the cloud while activating the cryptographic service with three main procedures: instance creation, key scattering, and key gathering/decryption process. In the new instance or project creation phase, as shown in FIG. 5 (a), the user 501 will use the IaaS interface to provision a new VM in the cloud (step 1). The user will then upload his encrypted database to the cloud virtual servers 503 for storage (step 2). As step 3, user 501 will install on the VM the web application that will access or process the encrypted data. Finally, as step 4 (not shown), the obfuscated security agent which is encoded with the user ID is uploaded to the cloud. In the key scattering phase, as shown in FIG. 5 (b), when the user writes or reads from the encrypted storage, the security agent will run. It will first send a certified virtual TPM-protected public key (PKVTPM) to the user (steps 1 and 2), who will use it to encrypt his application master key (K) and then sends it to the cloud (step 3). Once the master key reaches the VM, it will be decrypted with the virtual TPM-protected private key and scattered randomly in the VM RAM (step 4). The decrypt-scatter procedure is integrated and obfuscated so that observing the execution of the decrypt-scatter code will not reveal the key.

Finally, considering the key gathering and decryption process, each time a cloud-based application needs to access the data (step 5), the agent will start an integrated gather-decrypt procedure (step 6) that will decrypt the requested data using the scattered key in the RAM (step 7). Only one byte of the AES round key is reconstructed each time. The process starts with getting the last 4 bytes values from the randomly generated memory addresses. Such values will be used to generate the round key columns and XOR the plain text state in the different rounds. After XOR process, the new generated byte value will replace the previous value stored in the RAM. This process will be repeated until all the rounds are generated, scattered and XORed with the state. This process will replace the KeyExpansion and AddRoundKey functions used in a standard AES operation. The decryption will be implemented on-the-fly using the generated key bytes.

In another embodiment of the present invention is defined certain requirements that the present scattering solution must meet to securely scatter the cryptographic keys in the VM RAM. The overall aim is to generate an acceptable performance overhead with respect to standard implementations of the same encryption/decryption algorithms. The first requirement involves securely transferring the key. The key must be transferred securely between the data owner and the cloud VM, and remain encrypted in the client VM until the scattering process is called. The second requirement is effective hiding of the key. In order to address this requirement, the scattering strategy should store key chunks at addresses generated randomly within a memory block, and should not explicitly save either the memory addresses or their values in any variable during the whole encryption/decryption process. The third requirement is fast retrieving, i.e., retrieving the generated memory addresses and their values when they are needed.

The first and second requirements are satisfied by an integrated decrypt-scatter procedure, wherein only one byte of the cipher key is decrypted and scattered in the generated memory addresses at a time. The seed value is a combination of system time, the address of the first byte in the memory block and the process ID which are classically combined using a hash mix function. The memory block address and the process ID are mixed with the current time to make it highly likely that concurrent running agents will have a unique different seed value. In order to protect the security of the seed value, it is never exposed in the virtual machine RAM; rather, it is kept in a secure location that is part of the TCB (trusted computing base). Namely, we store the seed value in the virtual machine vTPM. The address of the first memory block will also be stored securely in the vTPM. The current protection method does not require hardware additions or modifications except for the availability of a vTPM. As far as the third requirement is involved, a negligible performance was experienced overhead during key transfer from the owner to the cloud VM. For this reason, focus was given to controlling the performance overhead due to the scattering and decryption process, in order to keep it bounded and less than the one of other solutions such as homomorphic encryption or garbled circuit.

Two key concepts foundational for the implementation of the present invention are the standard AES (Advanced Encryption Standard) implementation focusing on key expansion process, and Pseudo Random Number Generator concept (PRNG). AES is divided into two main stages: the key expansion process and the data encryption/decryption process. The key expansion process includes three different functions: RotWord, Subword and Rcon. The encryption process consists of four functions which are SubBytes, ShiftRows, MixColumns and AddRoundKey. There are two main types of random number generators—True Random Number Generator (TRNG) and Pseudo Random Number Generator (PRNG). In TRNG, the source of randomness is from natural phenomenon such as thermal noise. Usually TRNG generators are slow and hence are less likely to be implemented in practice. Conversely, PRNGs are fast and generate random values based on mathematical formula. The output of this type of generator is based on its initial seeding state. The Seed is a value that is used to initialize the PRNG. One of the more well-known simple PRNGs is the linear congruential generator (LCG) which is implemented in many programming languages. For example, in C the rand( ) function is implemented using a LCG method for random number generation. The present approach relies on PRNG to generate the memory addresses for scattering the key values. The random generator will produce the same results whenever the same seed value is re-used.

Figure 6A:
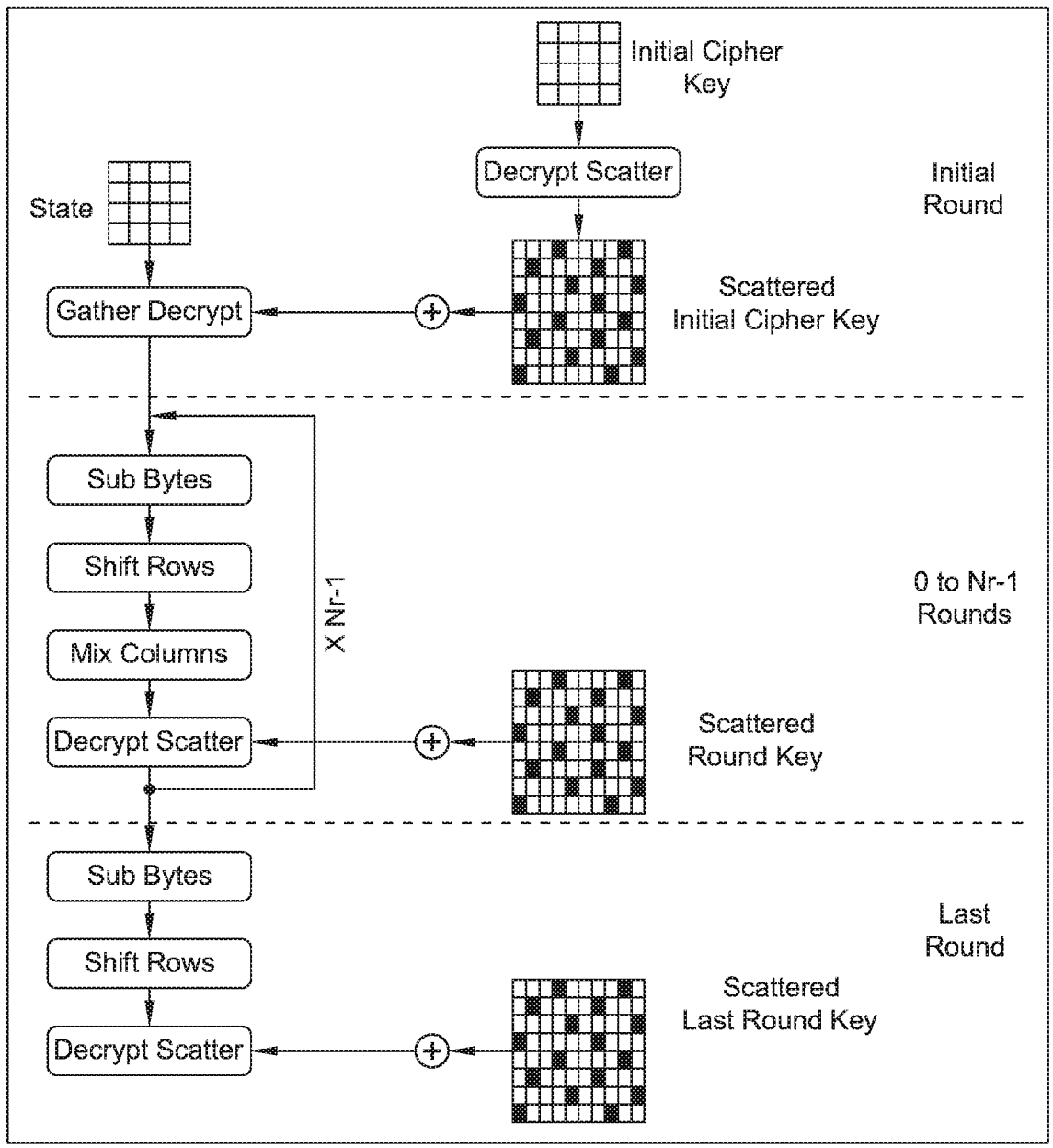
Figure 6B:
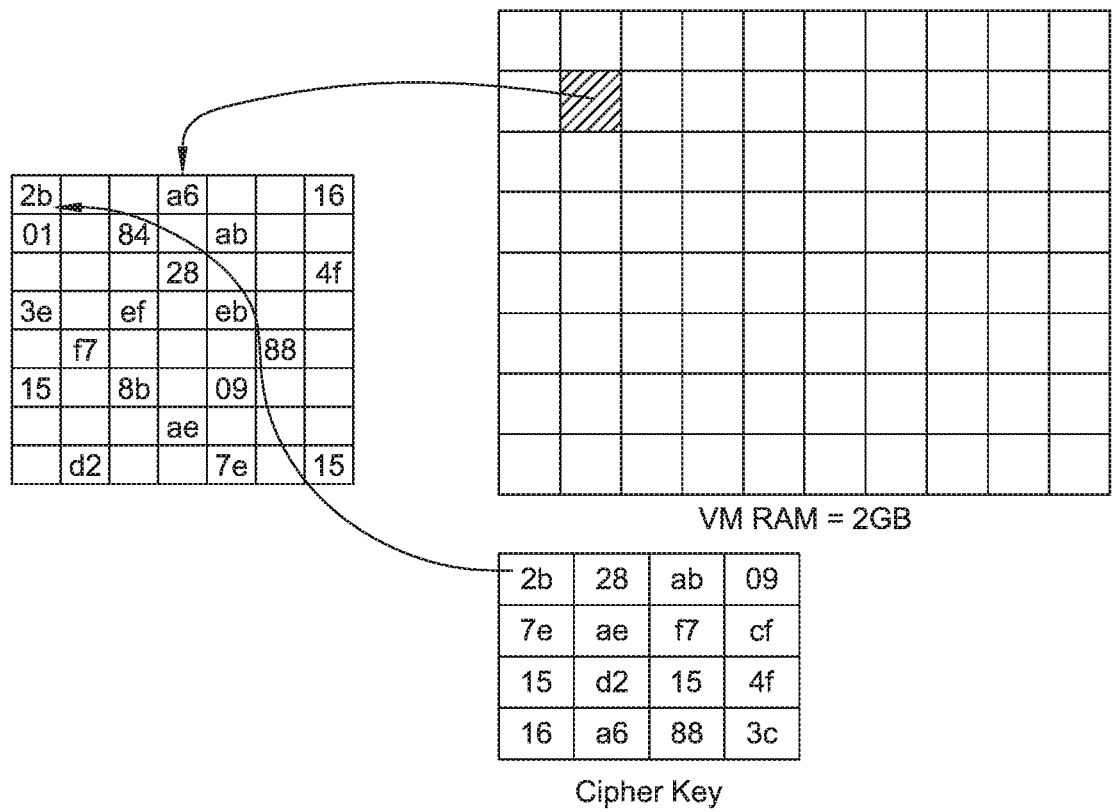

AES-CBC with a 128-bit key length was selected for proving the present concept, with a main objective of eliminating the need to have an entire AES keys schedule in memory to prevent an attacker from peeking at it. Therefore, the round keys are calculated on-the-fly and XORed with the state as needed. The present implementation is based on replacing the key scheduling process and the AddRoundKey function with decrypt-scatter and gather-decrypt shown in FIG. 6 (*a*). Considering decrypt-scatter, one kilobyte memory block are allocated to scatter the key bytes, as illustrated in FIG. 6 (*b*). The seed value is then generated and the uniqueness of the addresses generated from that seed is checked. After that, a single byte of the encrypted key is decrypted at a time and scattered in the generated memory addresses. Moreover, four temporary bytes are calculated by applying the functions RotWord, SubWord and Rcon and stored in four additional temporary addresses. Therefore, the scattered key will have five words instead of four which implies scattering in (16+4) different addresses. This additional word is used in generating the first column of each new round key, and holds the output of the core key schedule functions (RotWord, SubWord and Rcon) which are important in generating the new round keys.

In gather-decrypt, the cipher key bytes are gathered on-the-fly from the previously generated addresses and XORed with the state bytes. For each round, a new key is generated from the previous key bytes. Only a single pointer is defined in the implementation to hold a single address location at a time. The first column of each round key is calculated based on previous calculated bytes and the values in the temporary column. However, the remaining three columns of the newly generated round key are calculated from previous key bytes without the use of temporary column values. The temporary values are re-calculated and updated during the gathering operation. This process is repeated until all round keys are calculated and the input block is encrypted.

Figure 7:
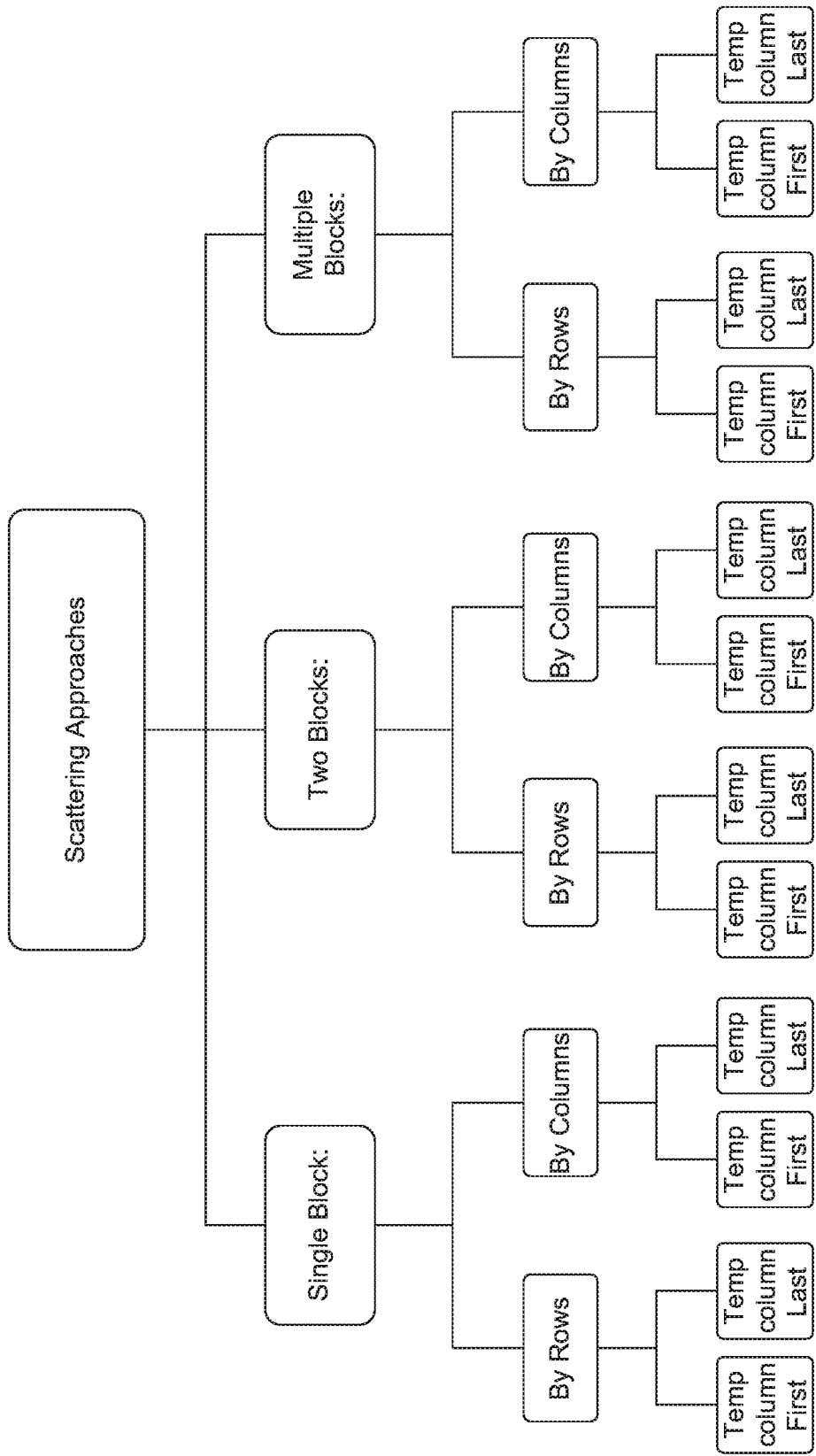
FIG. 7 shows 12 different scattering approaches in accordance with the present invention FIGS. 8 (a), 8 (b) and 8 (c) depict scattering within a single block, two blocks and multiple blocks in accordance with the present invention FIGS. 9 (a)-(d) show first, second, third and fourth techniques, respectively for generating addresses and temporary column locations in accordance with the present invention FIGS. 10 (a)-(d) depicts first, second, third and fourth generation column iterations in accordance with the present invention

In accordance with a preferable embodiment of the present invention, several design options were considered prior to implementation of the solution in accordance with the present invention. The first design included a number of blocks to scatter the key in, wherein scattering may be within a single block, two blocks or multiple blocks. The second design option considered involved a scattered addresses generation technique through columns or through rows. The third design option was a location of the temporary column used to store the temporary values. Based on the three design options considered for scattering the cryptographic keys, it was shown that 12 different scattering approaches may exist, as depicted in FIG. 7.

Key scattering in memory is implemented in different ways based on the number of allocated memory blocks. The key may be scattered within a single block, two blocks or multiple blocks. Scattering within a single block will require generating 16 different addresses to store the original key and four additional addresses to store the temporary values. Those addresses will be used as cached addresses to store the initial cryptographic key. In this case, the cipher key is decrypted once, using vTPM.RSA public key (PKvTPM) and stored in the scattered cached addresses. This is shown as step 1 in FIG. 8 (*a*). In order to generate the remaining round keys, another 20 different addresses will be generated to hold the newly calculated keys that are used to do the actual plaintext encryption. The values from the cached addresses will then be copied to the round keys addresses, as shown in step 2. Hence, in this technique 40 different addresses are to be maintained within a single block of RAM. After encrypting each plaintext block of 16-bytes, the values scattered in the cached addresses are copied to the round keys addresses and the gathering operation starts again, repeating step 2.

Considering two block scattering, the first block called the cached block, is to scatter the cipher key after decryption, while the other block called the round keys block, scatters the newly generated round keys. This is depicted as step 1 and 2 in FIG. 8 (*b*). The cached block values never change while the round keys block values change continuously to generate new round keys and encrypt or decrypt data. With this technique the cipher key is decrypted once and scattered in a randomly allocated block, similar to the single block technique. In this technique, a single seed value is used for both blocks to save space in the vTPM storage. The uniqueness of the 20 generated addresses is checked for both blocks. Once the seed value is set, the decryption of the cipher key will start. The cached block will be filled first (step 3) with the decrypted key bytes. Then its values are copied to the round keys block addresses (step 4). The temporary column values will also be calculated and stored in the scattered addresses. After encrypting each input block of 16-bytes, the values scattered in the cached block are copied to the addresses in the round keys block and the gathering operation starts again, repeating step 4.

In the multiple block scattering technique, the key is scattered in multiple different blocks of RAM which are allocated and de-allocated for every 16-bytes of the input data. This is depicted as step 1 in FIG. 8 (*c*). Only 20 different addresses are generated. The cipher key is decrypted with the RSA private key and distributed in the scattered addresses (step 2). Each newly generated round key overrides the previous round key in the addresses. Once a 16-bytes block of the plain text is encrypted, the memory block is de-allocated and a new block is allocated, repeating step 1. The cipher key is then decrypted again and scattered in the newly allocated block, repeating step 2. This technique requires allocating a new block for every 16-bytes of the plain text. The cipher key consequently needs to be decrypted each time a new block is allocated. Considering scattering in multiple blocks, the decrypt-scatter function is called multiple times, whereas, it is only called once in the previous two techniques. This technique is not implemented owing to the fact that it yields a huge performance overhead compared to the previous two techniques.

In another preferred embodiment of the present invention, different techniques are considered to generate scattered addresses positions. Moreover, a location of the temporary column which may be the first or last column of the cipher key is considered. The different techniques are defined to improve a performance of the scattering methods without affecting the security. In the first technique, called addresses generation, the addresses are generated by columns vertically, or by rows horizontally, to scatter the different key values. For example, the value of address index 1 in scattering by column is 7e, while the value of address index 1 in scattering by rows is 28. A PRNG usually works in a sequence, thus, to get the third generated value or address in our case, the first and the second addresses should be generated. Accordingly, in scattering by rows the state should be XORed with the round keys by rows rather than columns.

Figures 8C, 9A, 9B, 9C, 9D:
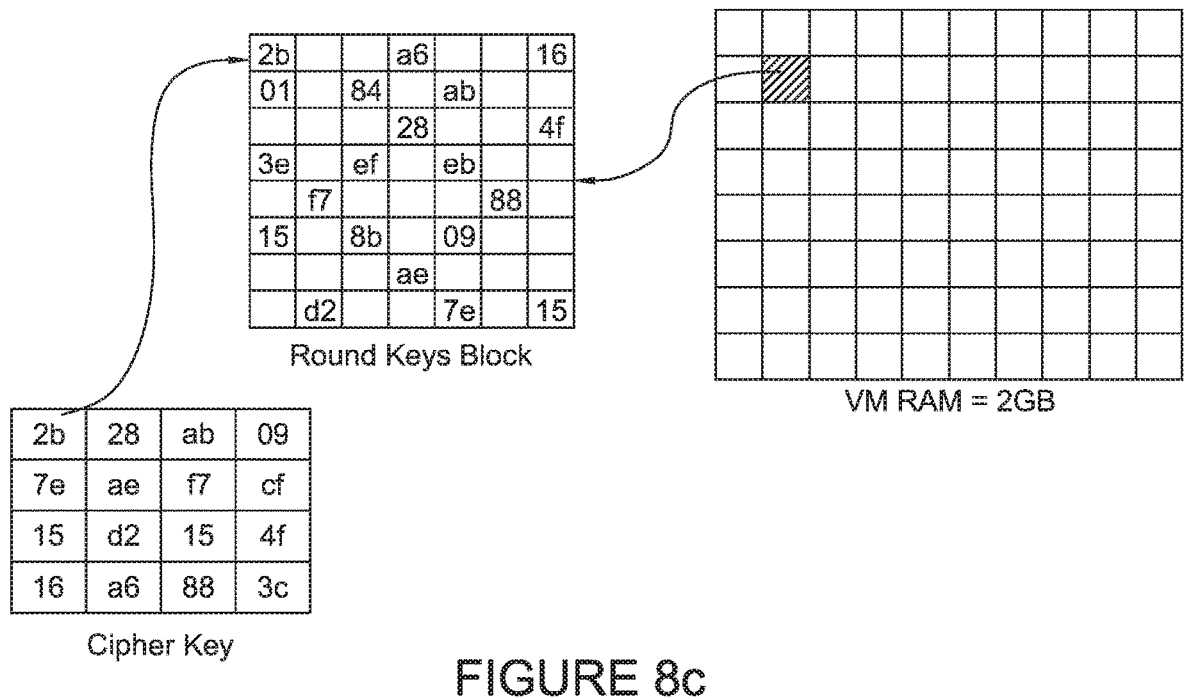
Figure 10A:
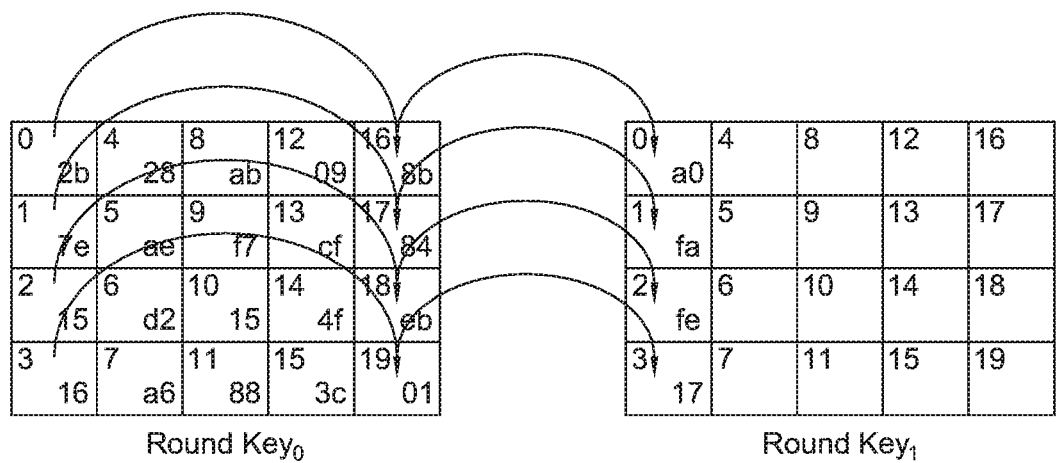
Figure 10B:
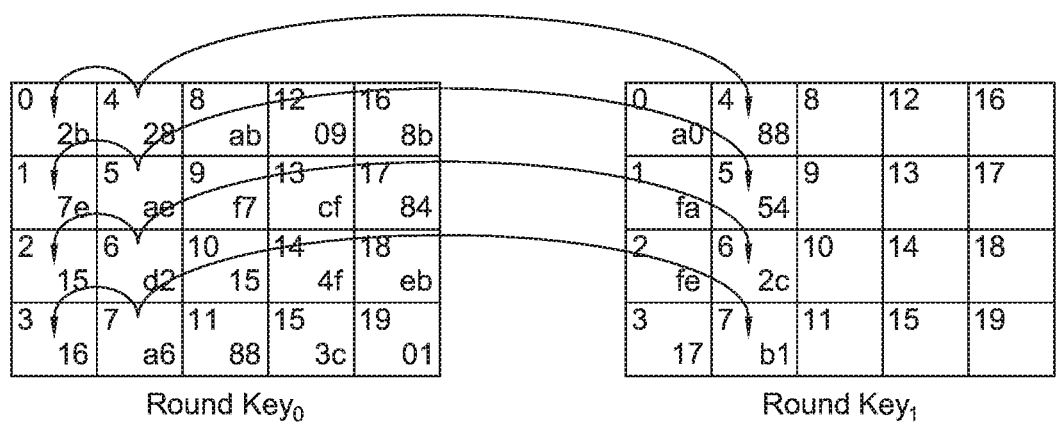
Figure 10C:
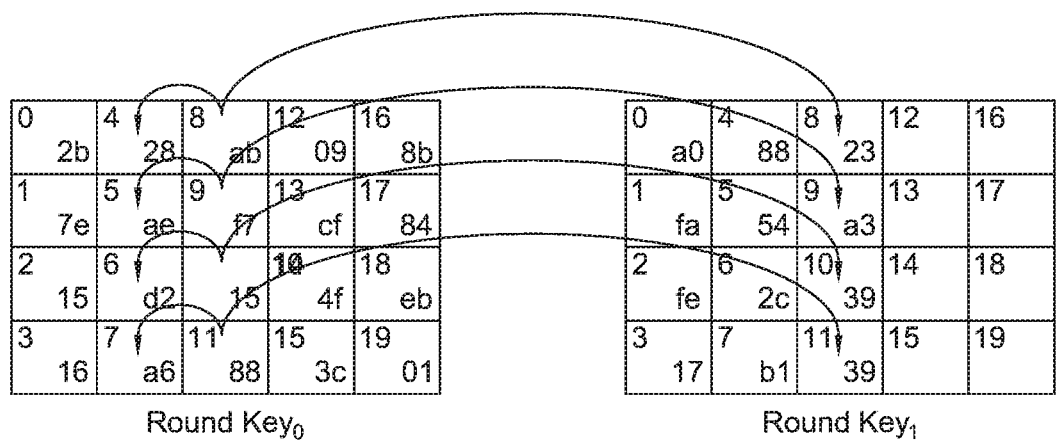
Figure 10D:
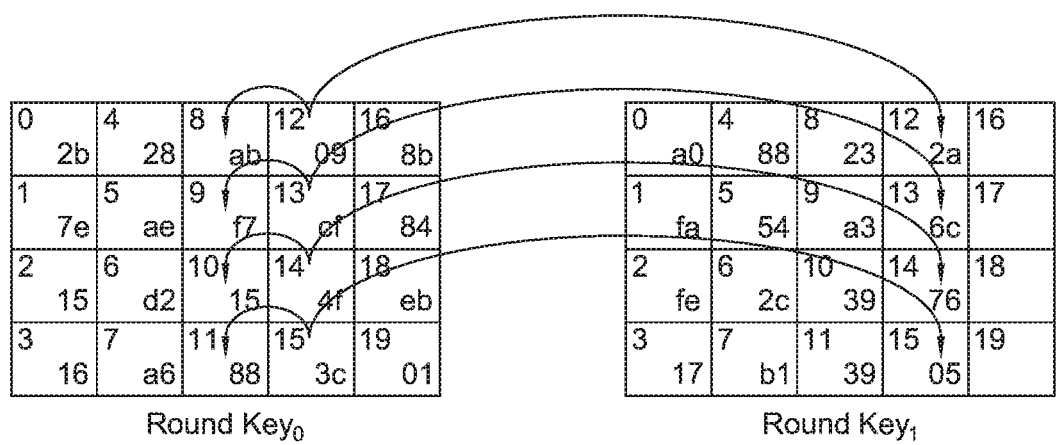

Considering the second technique called temporary column location, the temporary column holds the temporary values necessary for generating new round keys. When considering the location of the temporary column, the two most natural choices are to put the temporary addresses either in a column before the beginning or after the end of the key. Based on the way the addresses may be generated and the temporary column location, four different techniques exist as shown in FIG. 9. In the first technique (FIG. 9 (a)), the temporary addresses are placed at the end of the generated addresses (16,17,18,19) in which the addresses are scattered by column. The second technique is to scatter the key by rows rather than by column. In that technique the temporary addresses are placed at the end of each row of the generated addresses (4,9,14,19), as shown in FIG. 9 (b). In the third possible technique (FIG. 9 (c)), the temporary column is placed at the beginning in address (0,5,10,15) where the addresses are scattered by rows. In the last technique, the key is scattered by rows and the temporary addresses are placed at the beginning of each row in addresses (0,1,2,3), as shown in FIG. 9 (d). All functions and parameters that are introduced in the present implementation are as follows:

| | |
|---|---|
| DecryptScatter( ) | Decrypts a single byte of the cipher key and scatters it in different memory addresses within the 1 KB allocated block. It will also calculate the additional temporary values, when possible, and prepare them for the subsequent round keys. |
| GatherDecrypt( ) | Gathers the scattered key bytes on-the-fly and decrypts/encrypts the input block. It will gather and decrypt/encrypt a single byte at a time. |
| GetValueIn(index) | Retrieve the value in a single address location. |
| IsUnique(address) | Checks the uniqueness of the generated addresses given a specific seed value and the number of addresses needed for scattering the key bytes. |
| rand( ) | Standard random function in C that return a random value and is based on a LCG PRNG. |
| Rcon[ ] | Round constant word array |
| RotWord( ) | Performs cyclic permutation on the word of four-bytes |
| RSADecrypt(key) | Decrypt a single byte of the AES cipher key which is encrypted with the vTPM public RSA key. The OpenSSL library was used for this purpose. We used RSA with a 1024-bit key size and padding. |
| SubWord( ) | Performs S-box to the key bytes and return an output byte. |
| srand(seed) | Standard PRNG initialization function in C which takes a seed as an input parameter. |
| Cipher key | Cryptographic key that is used to generate all other round keys. |
| $K_{addr(i)}$ | Address of they key at index (i) |
| $*K_{addr(i)}$ | Value of the key at address index (i) |
| mem_block | The address of the first byte of the allocated memory block |
| mem_block_size | The size of the allocated block which is 1024 bytes in our implementation. |
| Nr | Number of rounds |
| Nk | Number of 32-bits words compromising the cipher key. |
| Nb | Number of 32-bit compromising the state |
| round | AES round number |
| temp | Temporary variable to store single temporary bytes. |

In all scattering techniques, the process starts by allocating a random memory block of 1024 bytes and generating a seed value. After allocation of the memory block and seed value generation, the quality of the selected seed in generating unique addresses within the allocated RAM block address range is tested. If the addresses are not unique, then a new seed is generated by allocating a new memory block and freeing the previous block. Once the generated addresses are unique then the seed value is set and stored in the VM vTPM. After this the encrypted key decryption and scattering starts.

Considering a first technique in accordance with the present invention, the key bytes are scattered by columns, reserving the last column (16,17,18 and 19) for temporary values. The first main step in decrypt-scatter is to retrieve the scattered address (Line 6 of Pseudo code 1). Kaddr(i) represents the address of the key byte at position i. For the first 16 generated addresses, the encrypted cipher key will be decrypted one byte at a time using the vTPM RSA private key. Each byte is then saved in the generated addresses sequences (Line 8). The temporary column values (16,17, 18,19) are prepared for generation of the next round key. For this purpose, the RotWord, SubWord and Rcon functions are performed while copying the values. For those addresses, the values are copied from values in addresses (13,14,15), respectively and their SubWord values are calculated as shown in Line 10. For the first value in the temporary column, address 16, one more operation must be performed which is Rcon (Line 12). The last value in address 19 will be copied from value in address 12 and its SubWord is calculated (Line 15). In this way, the generated addresses and their values get prepared for the gathering and decryption process.

Pseudo Code 1 DecryptScatter( ) for Technique I

```
1   Inputs seed, mem_block, mem_block_size, EncryptedKey[ ],round
2   begin
3     Initialize i ← 0
4     srand (seed)
5     while (i < 20) do
6       K_addr(i) ← mem_block + rand( ) mod mem_block_size
7       if (i < 16)
8         *K_addr(i) ← RSADecrypt(EncryptedKey[i])
9       else if (i < 19)
10        *K_addr(i) ← getSBoxValue(* K_addr(i-3))
11        if(i = 16)
12
```
$$*K_{addr(i)} \leftarrow *K_{addr(i)} \text{ xor } Rcon\left[\left(round \times \frac{4}{Nk}\right)\right]$$
```
13        end if
14      else
15        *K_addr(i) ← getSBoxValue(* K_addr(i-7))
16      end if
17      i ← i + 1
18    end while
19  end
```

In gather-decrypt, the key bytes will be calculated on-the-fly from the temporary column or previous byte values. The first column key bytes are calculated using the values in the temporary column as shown in (1). All other key bytes are calculated from the previous key byte as shown in (2).

$$*K_{addr(i \times 4+j)} = *K_{addr(i \times 4+j)} XOR *K_{addr(j+16)} *K_{addr(j+16)} \quad (1)$$

$$*K_{addr(i \times 4+j)} = *K_{addr(i \times 4+j)} XOR *K_{addr(i \times 4+j-4)} \quad (2)$$

The complete pseudo code for gather-decrypt is shown in Pseudo Code 2. Once the key byte is calculated, it is XORed with the state value (Lines 9 and 21). The temporary column is updated in preparation for the next round key generation while gathering (Lines 10 to 18). The first value in the temporary column, in address 16, is copied from the value in address 13 and its SubWord and Rcon are calculated (Lines 12 and 13). The values in addresses 17 and 18 are copied from values in addresses 14 and 15 and their SubWord are calculated (Line 17). The last value in the temporary column in address 19 will be copied from the value in address 12 (Line 15).

Pseudo Code 2 GatherDecrypt (round) for Technique I

```
1   Inputs: seed, mem_block, mem_block_size, state[ ] [ ], round
2   begin
3     srand (seed)
4     for i ← 0 to 4 do
5       for j ← 0 to 4 do
6         K_addr(j×4+j) ← mem_block + rand( ) mod mem_block_size
7         if (i = 0)
8           *K_addr(j) ← *K_addr(j) xor *K_addr(j+16)
9           state[i][j] ← state[i][j] xor *K_addr(j)
10        else if (i = 4)
11          if (j = 0)
12            K_addr(i×4+j) ← getSBoxValue(* K_addr(i×3+j+1))
13            *K_addr(i×4+j) ← val(K_addr(i×4+j))xor Rcon[(round × 4/Nk)]
14          else if (j = 3)
15            *K_addr(i×4+j) ← getSBoxValue(*K_addr(i×3))
16          else
17            *K_addr(i×4+j) ← getSBoxValue(*K_addr(i×3+j+1))
18          end if
19        else
20          *K_addr(i×4+j) ← *K_addr(i×4+j) xor *K_addr(i×4+j−4)
21          state[i][j] ← state[i][j] xor *K_addr(i×4+j)
22        end if
23      end for
24    end for
```

Considering a second technique in accordance with the present invention, encryption or decryption is performed by row, to improve the performance of the on-the-fly key generation. The main difference between this technique and the previous technique is the generated addresses of the key bytes. As shown in the pseudo-code, (Lines 6-8), the value of a previous byte is first saved as a temporary variable and then the pointer is moved to the next location to populate the temporary addresses. The temporary values are equal to the temporary variable value and their SubWords are calculated to prepare them for the next round (Lines 10-12). In Lines 13-15, the value in each address is equal to RSADecrypt (EncryptedKey [i×4 mod 19]). Using this algorithm, the keys are scattered in rows where the temporary addresses are placed at the end of each row. Unlike the first technique, it was not possible to perform RotWord and Rcon while scattering as the required values were not generated yet to be copied in those addresses. Therefore, those two functions will take place in the gathering function.

Pseudo Code 3 DecryptScatter ( ) for Technique II

```
1   Inputs: seed, mem_block, mem_block_size, EncryptedKey[ ]
2   begin
3     initialize i ← 0
4     srand (seed)
5     while (i<20)
6       if (i mod 5 = 4)
7         temp ← * K_addr(i−1)
8       end if
9       K_addr(i) ← mem_block+ rand( ) mod mom_block_size
10      if (i mod 5 = 4)
11        *K_addr(i) ← temp
12        *K_addr(i) ← getSBoxValue(temp)
13      else
14        *K_addr(i) ← RSADecrypt(EncryptedKey[i × 4 mod 19])
15      end if
16      i ← i+1
17    end while
18  end
```

In gather-decrypt, the process starts with preparing the temporary addresses values for the new round key generation using functions RotWord and Rcon (Lines 3-10). The SubWord function will not be called at this stage as it had been applied to the bytes while scattering the key itself. After the temporary column preparation, the gathering operation will start in a sequence (Lines 11-28). It is only for the first byte in each row that the byte is XORed with the last byte in the row which stores the temporary values. The key generation in those addresses is calculated as:

$$*K_{addr(i \times 5+j)} = *K_{addr(i \times 5+4)} \text{XOR} *$$

The temporary addresses will be assigned values from the previous bytes and their SubWord are calculated (Lines 19-21). The remaining bytes of the new round key are calculated using the new generated address in the previous byte XORed with the current value in those addresses: *Kaddr(ix5+j)=*Kaddr(ix5+j) XOR temp.

Pseudo Code 4 GatherDecypt(round) for Technique II

```
1   Inputs: seed, mem_block, mem_block_size, state[ ][ ],round
2   begin
3     Initialize i ← 4
4     temp ← *K_addr(i)
5     while (i<19)
6       *K_addr(i) ← *K_addr(i+5)
7       i ← i + 5
8     end while
9     *K_addr(i) ← temp
10    *K_addr(4) ← *K_addr(4) xor Rcon[round×4/Nk]
11    srand(seed)
12    for i← 0 to 4 do
13      for j← to 5 do
14        K_addr(ix5+j) ← mem_block+ rand( ) mod mem_block_size
15        if (j=0)
16          *K_addr(ix5+j) ← *K_addr(ix5) xor *K_addr(ix5+4)
17          state[i][j] ← state[i][j] xor *K_addr(ix5+j)
18          temp ← *K_addr(ix5+j)
19        else if (j=4)
20          *K_addr(ix5+j) ← temp
21          *K_addr(ix5+j) ← getSBoxValue(temp)
22        else
23          *K_addr(ix5+j) ← *K_addr(ix5+j) xor temp
24          state[i][j] ← state[i][j] xor *K_addr(ix5+j)
25          temp ← *K_addr(ix5+j)
26        end if
27      end for
28    end for
29  end
```

Considering a third technique in accordance with the present invention, the cipher key is scattered by rows as well, however, the temporary column used to generate the new round keys is placed at the beginning of each row in addresses 0, 5, 10 and 15. After getting the seed value and checking the derived generated addresses for uniqueness, the decryption and scattering of the cipher key will start. Referring to the pseudo code in (Line 8) we check whether this is a temporary column value, if so then the values in addresses 12,13,14 and 15 in the encrypted cipher key are decrypted and copied to those addresses. To prevent decrypting the key values twice (Line 10) the first column value is saved in a temp variable before getting its SubWord. The temp value will be copied later to the last column addresses 4,9,14 and 19 (Lines 13 and 14). The remaining key bytes are decrypted and scattered using the process in Line 16.

| Pseudo Code 5 DecryptScatter( ) for Technique III |
| --- |
| 1 Inputs: seed, mem_block, mem_block_size, EncryptedKey[ ] |
| 2 begin |
| 3 Initialize i←0 |
| 4 k ← 12 |
| 5 srand(seed) |
| 6 while (i<20) |
| 7    $K_{addr(i)}$ ← mem._block+ rand( ) mod mem_block_size |
| 8    if' (i mod 5 =0) |
| 9       *$K_{addr(i)}$ ← RSADecrypt(EncryptedKey[k]) |
| 10       temp ← *$K_{addr(i)}$ |
| 11       *$K_{addr(i)}$ ← getSBoxValue(temp) |
| 12       k ← k + 1 |
| 13    else if (i mod 5 = 4) |
| 14       *$K_{addr(i)}$ ← temp |
| 15    else |
| 16       *$K_{addr(i)}$ ← RSADecrypt(EncryptedKey[(i − 1) × 4 mod 19]) |
| 17    end if |
| 18    i←1+1 |
| 19 end while |
| 20 end |

Once the scattering is complete, the other process gather-decrypt will start. Unlike Technique II, SubWord of the temporary values cannot be performed while decrypting the state. Therefore, the gathering operation will start by copying the values in addresses 4, 9, 14 and 19 to addresses 0, 5, 10 and 15 respectively. The SubWord of those values are then calculated for round keys (1-10) as the SubWord of the first round was already calculated while scattering as described in the previous pseudocode, (Lines 4-9). In Lines 10-16, the RotWord is calculated on those values. In line 17, Rcon is used for the temporary value in address 0. Once the temporary values are ready to generate the new round keys, the decryption will begin (Lines 19-30). The values of the first byte in each row, the temporary values, will be stored in a temp value to be XORed with the next address value. The other new round key values calculated from the previous bytes values (Line 25).

| Pseudo Code 6 GatherDecrypt( ) for Technique III |
| --- |
| 1 Inputs: seed, mem_block, mem_block_size, state[ ][ ],round |
| 2 begin |
| 3 Initialize i←0 |
| 4 if (round>1) |
| 5 while (i<=15) |
| 6    *$K_{addr(i)}$ ← getSBoxValue(*$K_{addr(i+4)}$) |
| 7    i ← i + 5 |
| 8 end while |
| 9 end if |
| 10 i ← 0 |
| 11 temp ← *$K_{addr(i)}$ |
| 12 while (i<15) |
| 13    *$K_{addr(i)}$ ← *$K_{addr(i+5)}$ |
| 14    i ← i + 5 |
| 15 end while |
| 16 *$K_{addr(i)}$ ← temp |
| 17 *$K_{addr(0)}$ ← *$K_{addr(0)}$ xor Rcon[round×4/Nk] |
| 18 srand (seed) |
| 19 for i ← 0 to 4 |
| 20    for j ← 0 to 5 |
| 21       $K_{addr(i×5+j)}$ ← mem._block+ rand( ) mod mem_block_size |
| 22       if (j=0) |
| 23          temp ← *$K_{addr(i×5+j)}$ |
| 24       else |
| 25          *$K_{addr(i×5+j)}$ ← *$K_{addr(i×5+j)}$ xor temp |
| 26          temp ← *$K_{addr(i×5+j)}$ |
| 27          state[i][j−1] ← state[i][j−1] xor temp |
| 28       end if |
| 29    end for |
| 30 end for |
| 31 end |

Based on different techniques tested, the execution time of scattering in a single block was slower than two blocks scattering, and on comparing scattering by columns against scattering by rows, the scattering by rows is faster. Therefore, scattering by rows is implemented with different options for locating the temporary column. However, scattering in multiple blocks generates a huge performance overhead due to the fact that the RSA decryption of the cipher key is performed for every 16 bytes block of the plain text. The first implementation or basic approach focused on meeting security requirements more than minimizing performance overhead. In this implementation the temporary column for the new round key generation was not prepared. Instead, in decrypt-scatter those addresses were filled up with zero values and stored in the scattered addresses until gather-decrypt was called. At that point, the temporary column addresses get prepared first before starting the actual values gathering. Specifically, the values in addresses 12,13, 14,15 were copied first to the temporary values addresses 16,17,18,19. Then, RotWord, SubWord and Rcon functions were executed separately. After this, a single byte from the actual key values was retrieved at a time and XORed with the state value. In each gather-decrypt process, those processes were performed and repeated to get the temporary values.

Considering performance enhanced approaches, the temporary column was prepared while decrypting the cipher key bytes and scattering their values. Either in single block or two blocks scattering, this column is prepared, by applying RotWord, SubWord and Rcon operations, and stored with the other key bytes in cached addresses with single block scattering or cached block with two blocks scattering. Those values were then copied to the round keys block addresses which is actually maintained for encrypting the input data. Moreover, in gather-decrypt those values were modified and prepared for the next round key generation while XORing the state value itself. Therefore, there are no separate operations for preparing this column before gathering the actual key bytes values.

Performance comparison in accordance with the present invention focusses on three main factors: execution time, throughput and performance overhead for scattering-versus-gathering while encrypting different file sizes. The execution time is calculated by measuring the total time required for encryption. Moreover, the improvement between approaches is calculated as follows:

Percentage of improvement gain between Approach $X$ and Approach $Y$=(Approach $X$ execution time)−(Approach $Y$ execution time)/(Approach $X$ execution time)×100

For performance evaluation, the average execution time of five different runs were calculated, and resulted in average execution times of each approach when encrypting files of different sizes ranging from 0.5 MB to 10 MB. The Basic Approach was written without any performance considerations. The time it took to encrypt 10 MB was 12.87 seconds. In Approach I, the key was scattered in a single block and several operations were performed together whenever possible such as RotWord, SubWord, Rcon and gather-decrypt. That reduced encryption time by almost 40% with encrypting 10 MB file compared to the Basic Approach. In Approach II, the key was scattered in two blocks, and the encryption time with 10 MB file was further reduced slightly to 7.2 seconds. The performance of that approach was then further improved by performing encryption by rows instead of columns (Approach III). The encryption time was reduced to 4.7 seconds. The last approach (Approach IV) also improved encryption execution time bringing the total time to 3.46 seconds. Our standard AES benchmark encrypted a 10 MB file in 1.41 seconds.

The total encryption throughput is computed by dividing the total plain text size by the total time in seconds.

Encryption throughput (MB/sec)=Σ size of the file to be encrypted/Σ time

The scattering time and the gathering time in each approach was measured. Similar to the total execution time calculation, the average execution time was measured across five runs. The average total execution time is the total scattering, gathering and other standard AES encryption functions times. The average scattering time is observed to be almost constant for all approaches. However, the gathering time varies in each approach with different file sizes. This is due to the fact that scattering is done once and then the values are copied from the cached scattered locations. Therefore, the scattering time is almost the same for all approaches. The share of scattering time is almost the same in all approaches. Again, this is due to the fact that scattering is done only once at the beginning when the cipher key is transferred. It is then copied from the cached scattered addresses to the round key block addresses. The main factor affecting the total execution time is gathering. It was hence possible to reduce the percentage of gathering the scattered key bytes from 64% in Approach I to 38% in Approach IV.

Scattering computation percentage=(average scattering time)/(average total execution time)×100

Gathering computation percentage=(average gathering time)/(average total execution time)×100

In accordance with the present invention, three different factors that impact performance results are: file size, number of blocks used for scattering and the scattering technique. The larger the file size, the longer its encryption time will be. With scattering size-related increase is larger than the one of standard AES as shown in FIG. 10. Execution times for smaller file sizes (0.5 MB and 1 MB) do not produce noticeable differences as they are still executed within less than one second. However, with bigger size files the execution time difference become more noticeable. It is still less than one second with standard AES, while it is more than one second for Approach IV, and more than 3 seconds for other implementations. This is due to the fact that in the standard AES, the key schedule is calculated only once and stored in RAM before the AES encryption starts. However, in our implementations, the cipher key is copied for every 16-bytes block from a cached block to a round key block. Further, the other round keys are calculated on-the-fly during the encryption. With bigger file sizes, this process is repeated several times for each input block and the performance becomes slower. For example, with a 10 MB file the process of copying the cipher key will be calculated as:

File size (bytes)/Block size (bytes)=(10×1024×1024)/16=655,360

Therefore, the cipher key is copied 655,360 times with a 10 MB file which justifies the slower execution times with bigger file sizes when scattering the key.

Comparing the four performance enhanced implementations, it was observed that the number of scattering blocks only affected the encryption performance slightly. For instance, there was a slight performance difference between Approach I where the key was scattered in a single block and Approach II where the key was scattered in two blocks. There was a 6.6% improvement on the encryption time with a 10 MB file for Approach II compared to Approach I. The slight difference between Approach II and Approach I was due to the way the cipher key is copied from cached block or addresses to the round key block for every 16 bytes of the input block. The main factor affecting that was the way the scattered values were retrieved using the rand( ) and srand( ) functions. For instance, to get the value in index n using the rand( ) function, all values from 1 to (n−1) should be calculated first. With Approach I, the cipher key is copied from the same block in addresses 20-39 to round key addresses from 0-19. However, in Approach II and all other approaches with two blocks scattering, the cipher key is copied from the cached block to the round key block without iterating over 40 different addresses like in Approach I.

The slight difference between Approach II and Approach I was due to the way the cipher key was copied from cached block or addresses to the round key block for every 16 bytes of the input block. The main factor affecting that was the way we retrieved the scattered values using the rand( ) and srand( ) functions. For instance, to get the value in index n using rand( ) function, all values from 1 to n−1 should be calculated first. With Approach I, the cipher key was copied from the same block in addresses 20-39 to round key addresses from 0-19. However, in Approach II and all other approaches with two blocks scattering, the cipher key was copied from the cached block to the round key block without iterating over 40 different addresses like in Approach I. Therefore, we ignored implementing single block with other techniques and we narrow down our implementations to scattering the key across two blocks.

Besides the effect of the number of scattering blocks on the performance results, other design variables such as scattering by rows versus columns and the location of the temporary values also affected the performance. The decision to scatter by columns or by rows affects the implementations' performance. Scattering by rows produces better results, with a 34.6% improvement, than scattering by columns. The main factor affecting the performance in the present scattering approach is the gather-decrypt function. In gather-decrypt, the values were retrieved from the scattered addresses using the rand( ) and srand( ) functions. In scattering by columns, in order to obtain the values in the first byte of each column located in addresses (0,1,2,3), the values in the temporary addresses (16,17,18,19) are needed which requires many iterations and initializations to the random number generator to get those values. Moreover, the other key bytes will also require many iterations to be XORed with previous bytes located in distant addresses as shown in FIG. 10. Both blocks in the figure represent the same round key block in the present implementation, and are represented as separate blocks for presentation and illustration purposes. For example, to get Round Key 1 from scattered RoundKey0, the value in index 0 is XORed with the value in index 16. The result will override the current value in address 0 as shown in FIG. 10 (a). Then, the value in index 2 is XORed with the value in index 17 to get the new value in index 2. That will be repeated for values in indexes 3 and 4 which will be XORed with values in indexes 18 and 19. In FIG. 10 (b), the values in indexes (4, 5, 6, 7) are XORed with the values in indexes (0,1,2, 3) and the result will override the values in (4,5,6 and 7) to get RoundKey1 bytes. The further the distance between those indexes, the more time it will require to iterate and get the new values. FIGS. 10 (c) and 10 (d) depict third column and fourth column generations, respectively.

Scattering by rows executes faster than scattering by columns due to the way the new round keys are generated and allocated next to each other. Moreover, the temporary column values are placed in addresses indexes (4,9,14,19) which are nearer to the first column bytes of the new round key (0,5,10,15) compared to XORing values in (0,1,2,3) with values in (16,17,18,19). Therefore, lesser the difference between indexes, faster the execution time. The fact that the best performance was observed with Approach IV where the temporary column is placed at the beginning is due to the way new round keys are generated in a sequence. In this implementation approach, the random number generator is initialized once for each new round key generation because the values will be retrieved in a sequence. The only disadvantage of that is need for the preparation of the temporary column, which is inefficient to take place during encryption itself. Rather, it is prepared after the encryption process as the values in (4, 9, 14, 19) should be generated first and then copied to the temporary column for further operations. Despite that, Approach IV was observed to deliver the best performance.

Another aspect of the present invention deals with attack scenarios through malicious insiders, tenants or an external attacker through the management VM or Dom( ). It is assumed that the attacker does not have the credentials which allows him to authenticate to a user VM. Initially, considering robustness against AESKeyFinder, in Xen, cloud administrators may dump the memory of any VM using a simple command in Dom0, which is $ xl dump-core domain-id [filename]. This command dumps the RAM of DomU to a specific folder in the host server. In the current attack experiment, a Debian VM was created on Xen 4.4 project, and AES encryption was run without key scattering in that VM, DomU. The memory dump was captured using the above command from Dom0 while the encryption was running in DomU (memoryDump1). Subsequent to this step, customized AES encryption was performed on the same DomU. The memory dump was captured again while the encryption was running (memoryDump2). The results obtained while analysing the first dump (memoryDump1) was similar to experiment results. The cipher key was captured in few seconds. It was a simple attack to capture the AES key while it was not scattered. Analysing the second memory dump (memoryDump2), the tool was unable to identify our scattered key. However, this alone was not meaningful as AES key recovery is commonly based on the key schedule. In the present implementation the key schedule process of AES was customized and at any point of time only a single round key is scattered in memory.

In another embodiment, considering resiliency against determining the scattering block, it was assumed that the attacker has the RAM dump and knows the cryptographic algorithm used for encrypting the data. The objective of this attack is to identify the block (1024 bytes of RAM) used to scatter the key bytes. It was assumed that the memory dump size is 2 GB. There are two scenarios in this attack. The first scenario is that the attacker is able to obtain the dump but unable to identify the process using where the key scattering is running. The second scenario is that the attacker holds the memory dump and can identify the memory allocated for our scattering/gathering process. In the first scenario, the attacker objective is to identify the block where the key is scattered in the memory dump. However, he cannot access the process where the scattering/gathering was running. Therefore, to calculate the search space the attacker will need to scan and find the 1024 bytes block. Linear scan calculations were performed. As the attacker is aware about the implemented algorithm for scattering and gathering the key, he knows that the memory is allocated using the malloc ( ) function. By default, the malloc( ) function in C allocates memory blocks in multiples of eight bytes and therefore, the attacker will only need to search memory addresses that are multiples of eight. This shows that the attacker will have a large search space to identify the exact memory position used for the scattering.

Considering the second attack scenario (security analysis with process dump), it is assumed that the attacker holds the memory dump and is able to identify and access the scattering/gathering process from the dump. There are many tools which can identify and dump the memory of a specific process from the total memory dump. This will narrow down the attacker brute force search space. The size of the process dump varies under different machines and operating systems. In this attack scenario, the search space is identified and measured. However, the attacker will need more efforts to analyze the available search space and brute force the cipher key. Further, considering resiliency against cipher key re-assembly attack scenario, objective of an attacker is to re-assemble the cipher key scattered in the memory block. The attacker will analyze all the possible key positions in order to re-assemble the correct cipher key bytes. In such a situation, the attacker needs to correctly guess 16 different bytes scattered within the identified possible positions. To correctly guess the first byte of the key, the attacker needs to try 1024 possibilities. He needs to try 1023 possibilities for the second byte and 1022 for the third byte and so on. To re-assemble a key of (N) 16 bytes for a block size (B) of 1K, the attacker needs to try $1.29 \times 10^{48}$ different possibilities. This shows the difficulty of reassembling the scattered key knowing the block. To calculate the total time of getting the right block and reassembling the key bytes while analyzing the memory dump, the attacker needs to analyze all the possible address positions. Then, with each address position, he needs to try $1.29 \times 10^{48}$ possibilities to check if he gets the correct key bytes.

The attack scenarios presented above display the difficultly to identify and locate the address of the block where the key is scattered in. Moreover, knowing the block is only one factor and the other factor is the re-assembling of the key itself, the best chance for the attacker to get the block and reassemble the key will require checking $4.45 \times 10^{44}$ different possibilities. The robustness of our technique against an exhaustive brute force attack is therefore higher than that of a standard AES implementation with 128-bit key ($3.4 \times 10^8$).

In cloud computing, data is processed outside the control of the owner. As cloud services spread globally, the interest for radical solutions to cloud confidentiality like Fully Homomorphic Encryption (FHE) schemes has grown. Moreover, the interest for hybrid schemes using homomorphic encryption together with other emerging cryptographic techniques (i.e., garbled circuits and attribute-based encryption) has begun to draw interest as well. Still, most cloud-based applications will at some point need to process encrypted data and therefore to perform data encryption/decryption while exposing the cipher key. The main question behind the present invention is whether these cryptographic services could be offered securely on the cloud itself without revealing the cryptographic keys and with acceptable performance overhead. The present technique will play a role in the set-up of cloud-based encryption. In particular, it could be a part of a general solution for securing the application of cryptographic keys. This can refer to both obfuscating the keys while they are being used by an encryption/decryption facility, or the verification of the cryptographic architecture in place at the cloud provider to make sure that the keys are not peeked at.

The present invention shows that automated protection of cryptographic keys in the cloud is feasible, even without introducing major additions to currently available cloud stacks. As demonstrated, by simply scattering a cryptographic key in a VM memory and then gathering it one byte a time to generate round keys and encrypt the data can effectively prevent leakage of key bytes. Brute forcing our scattering solution requires $4.45 \times 10^{44}$ compared to $3.4 \times 10^{38}$ for brute forcing AES with a 128-bit key. Moreover, the performance penalty of key gathering using different strategies was obtained, so that the time required to encrypt a 10 MB data file with scattered key is 3.46 seconds, to be compared with 1.41 seconds of a benchmark AES implementation.

The current solution already incorporates a Segregation of Duties security principle, stating that key management ideally should be separated from the cloud provider hosting the data. This provides some protection against both an external breach of the service provider as well as an attack originating from a privileged user/employee of the provider. In an embodiment, the seed value generation is improved by obtaining it from a true random generator like the OS random number generator (/dev/random or /dev/urandom) on Linux or CryptGenRandomo. However, an attacker with administrator privileges could doctor such generators. More realistically, it could be obtained from the vTPM random number generator functionality, and then mixed with the process ID of each running agent to ensure that each process gets a unique seed.

In another embodiment, dynamic agent obfuscation techniques are implemented on top of the current approach in a way that will prevent the attacker from knowing the approach being running on their premises. Obfuscation will add an additional layer which will prevent the attackers from understanding the present scattering technique. However, it is implemented carefully in a way that will have minimal performance overhead. In another embodiment, the present solution is integrated with the current cryptography as a service solutions available in the market to hide the cryptographic keys. It is integrated with the current full disk encryption solutions such as VeraCrypt and BitLocker to be hidden within a device driver and not peeked as a separate process in the RAM.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

The invention claimed is:

1. A method of securing a key in a cloud using decrypt-scatter and gather-decrypt techniques, the key comprising a plurality of key chunks, the method comprising the steps of:
   creating a Virtual Machine, wherein the Virtual Machine has a Random Access Memory;
   generating a plurality of scattered memory addresses in the Random Access Memory of the Virtual Machine;
   storing the plurality of key chunks in the plurality of generated scattered memory addresses, such that each scattered memory address stores a single key chunk among the plurality of key chunks; and
   generating a plurality of temporary memory addresses, wherein each temporary memory address stores a temporary value used for calculating a round key,
   wherein the plurality of key chunks are scattered by columns within the plurality of scattered memory addresses rather than scattering by row.

2. The method of claim 1, wherein the plurality of temporary memory addresses each storing a temporary value used to calculate the round keys are located at an end of the plurality of scattered memory addresses scattered by columns.

3. The method of claim 1, wherein the plurality of temporary memory addresses each storing a temporary value used to calculate the round keys are located at a beginning of the plurality of scattered memory addresses scattered by columns.

4. The method according to claim 1, wherein the round key is calculated only when decrypting data, and the round key calculated is the minimum required to decrypt data.

5. The method according to claim 1, wherein the plurality of key chunks are stored in the form of bytes.

6. The method according to claim 1, wherein the plurality of scattered memory addresses are randomly generated memory address locations that are spread across rows and columns.

7. The method according to claim 1, wherein the plurality of scattered memory addresses are randomly generated using a Pseudo Random Number Generator (PRNG).

8. The method according to claim 1, wherein the method further comprises implementing an Advanced Encryption Standard (AES) encryption algorithm on the plurality of key chunks.

9. The method according to claim 8, wherein the calculated round key is XORed with an array of plain text chunks on which the Advanced Encryption Standard (AES) algorithm is implemented.

10. A method of securing a key in a cloud using decrypt-scatter and gather-decrypt techniques, the key comprising a plurality of key chunks, the method comprising the steps of:
    creating a Virtual Machine, wherein the Virtual Machine has a Random Access Memory;
    generating a plurality of scattered memory addresses in the Random Access Memory of the Virtual Machine;
    storing the plurality of key chunks in the plurality of generated scattered memory addresses, such that each scattered memory address stores a single key chunk among the plurality of key chunks; and
    generating a plurality of temporary memory addresses, wherein each temporary memory address stores a temporary value used for calculating a round key,
    wherein the plurality of key chunks are scattered by rows within the plurality of scattered memory addresses rather than scattering by column.

11. The method of claim 10, wherein the plurality of temporary memory addresses each storing a temporary value used to generate a round key are located at an end of the plurality of the scattered memory addresses scattered by rows.

12. The method of claim 10, wherein the plurality of temporary memory addresses each storing a temporary value used to generate a round key are located at a beginning of the plurality of scattered memory addresses scattered by rows.

13. The method according to claim 10, wherein the round key is calculated only when decrypting data, and the round key calculated is the minimum required to decrypt data.

14. The method according to claim 10, wherein the plurality of key chunks are stored in the form of bytes.

15. The method according to claim 10, wherein the plurality of scattered memory addresses are randomly generated memory address locations that are spread across rows and columns.

16. The method according to claim 10, wherein the plurality of scattered memory addresses are randomly generated using a Pseudo Random Number Generator (PRNG).

17. The method according to claim 10, wherein the method further comprises implementing an Advanced Encryption Standard (AES) encryption algorithm on the plurality of key chunks.

18. The method according to claim 17, wherein the calculated round key is XORed with an array of plain text chunks on which the Advanced Encryption Standard (AES) algorithm is implemented.

* * * * *